US006741179B2

(12) United States Patent
Young

(10) Patent No.: US 6,741,179 B2
(45) Date of Patent: May 25, 2004

(54) APPARATUS FOR FLOW DETECTION, MEASUREMENT AND CONTROL AND SYSTEM FOR USE OF SAME

(76) Inventor: Richard Young, 2921 NW 160$^{TH}$, Edmond, OK (US) 73013

(*) Notice: Subject to any disclaimer, the term of this patent is extended or adjusted under 35 U.S.C. 154(b) by 68 days.

(21) Appl. No.: 09/993,537

(22) Filed: Nov. 6, 2001

(65) Prior Publication Data

US 2002/0101355 A1 Aug. 1, 2002

Related U.S. Application Data

(63) Continuation-in-part of application No. 09/648,444, filed on Aug. 25, 2000, now abandoned, which is a continuation-in-part of application No. 09/567,510, filed on May 8, 2000, now Pat. No. 6,333,695, which is a continuation-in-part of application No. 09/483,999, filed on Jan. 18, 2000, now Pat. No. 6,239,708, which is a continuation-in-part of application No. 09/098,976, filed on Jun. 17, 1998, now Pat. No. 6,081,196.

(51) Int. Cl.$^7$ ............................................... G08B 21/00
(52) U.S. Cl. ........................ 340/606; 340/61.1; 73/251
(58) Field of Search ................................ 340/606, 607, 340/608, 609, 610, 611, 618; 73/242, 251, 273, 861.58, 861.61, 861.71; 137/80, 119.06, 624.2, 624.15, 625.2; 251/129.16

(56) References Cited

U.S. PATENT DOCUMENTS 3,762,442 A * 10/1973 Paul .......................... 137/625.2
3,876,009 A    4/1975 Johnson, Jr.
4,096,747 A * 6/1978 Gilson .......................... 73/251
4,573,361 A * 3/1986 Kobold .................... 73/861.71

(List continued on next page.)

OTHER PUBLICATIONS

Potter Marketing Brochure showing flow meters with alarm outputs.
EnerCon, Tri–Water Systems, Engineering Instruction Manual 216–E–2.
Gems Sensors, Liquid Level Flow and Pressure Sensors Catalogue.
Series 007 Double Check Valve Assembly brochure.
Series 07S Residential Fire Sprinkler System Dual Check Backflow Preventers brochure.

*Primary Examiner*—Van Trieu
(74) *Attorney, Agent, or Firm*—Edward L. White

(57) ABSTRACT

An improvement flow sensor of the type having inlet and outlet ports, a moving plate unit for moving in response to fluid flow through the sensor, a sensor unit for sensing the movement of the moving plate and creating a signal related to its location, and biasing unit for biasing the plate towards the inlet ("base elements"). One improvement comprises the moving plate composed of a magnetizable material and the sensor unit comprised of a steel sensor disposed adjacent to a path traveled by the moving plate for sensing the location of the moving plate. Another improvement is to a sensor having, in addition to the base elements, a sealing unit, the improved sealing unit comprising: a bullet rod slidingly received in a bullet port mounted within the sensor and including at a terminal end of the bullet rod a sealing plate adapted to sealingly engage the moving orifice plate, the bullet rod moving in relation to the moving plate until a flared end of the bullet rod engages a bullet port, causing the sealing plate to disengage from the moving plate allowing fluid to pass through the orifice plate. Still another improvement to a sensor having the base elements plus a sealing unit comprises a second sealing unit for preventing flow between an outer periphery of the moving plate and an inner surface of the sensor. A system for using improved sensors in a plumbing system for flow detection and leak prevention.

14 Claims, 9 Drawing Sheets

U.S. PATENT DOCUMENTS

| | | |
|---|---|---|
| 4,791,414 A | 12/1988 | Griess |
| 4,805,701 A | 2/1989 | Mountford |
| 4,905,962 A * | 3/1990 | Iljin .................. 251/129.16 |
| 5,085,076 A | 2/1992 | Engelmann |
| 5,139,044 A | 8/1992 | Otten et al. |
| 5,228,469 A | 7/1993 | Otten et al. |
| 5,236,002 A | 8/1993 | Martin et al. |
| 5,390,744 A | 2/1995 | McHugh |
| 5,419,203 A | 5/1995 | Carmichael |
| 5,483,838 A | 1/1996 | Holden |
| 5,546,801 A | 8/1996 | Swinson et al. |
| 5,671,774 A | 9/1997 | Klein et al. |
| 5,944,051 A | 8/1999 | Johnson |

* cited by examiner

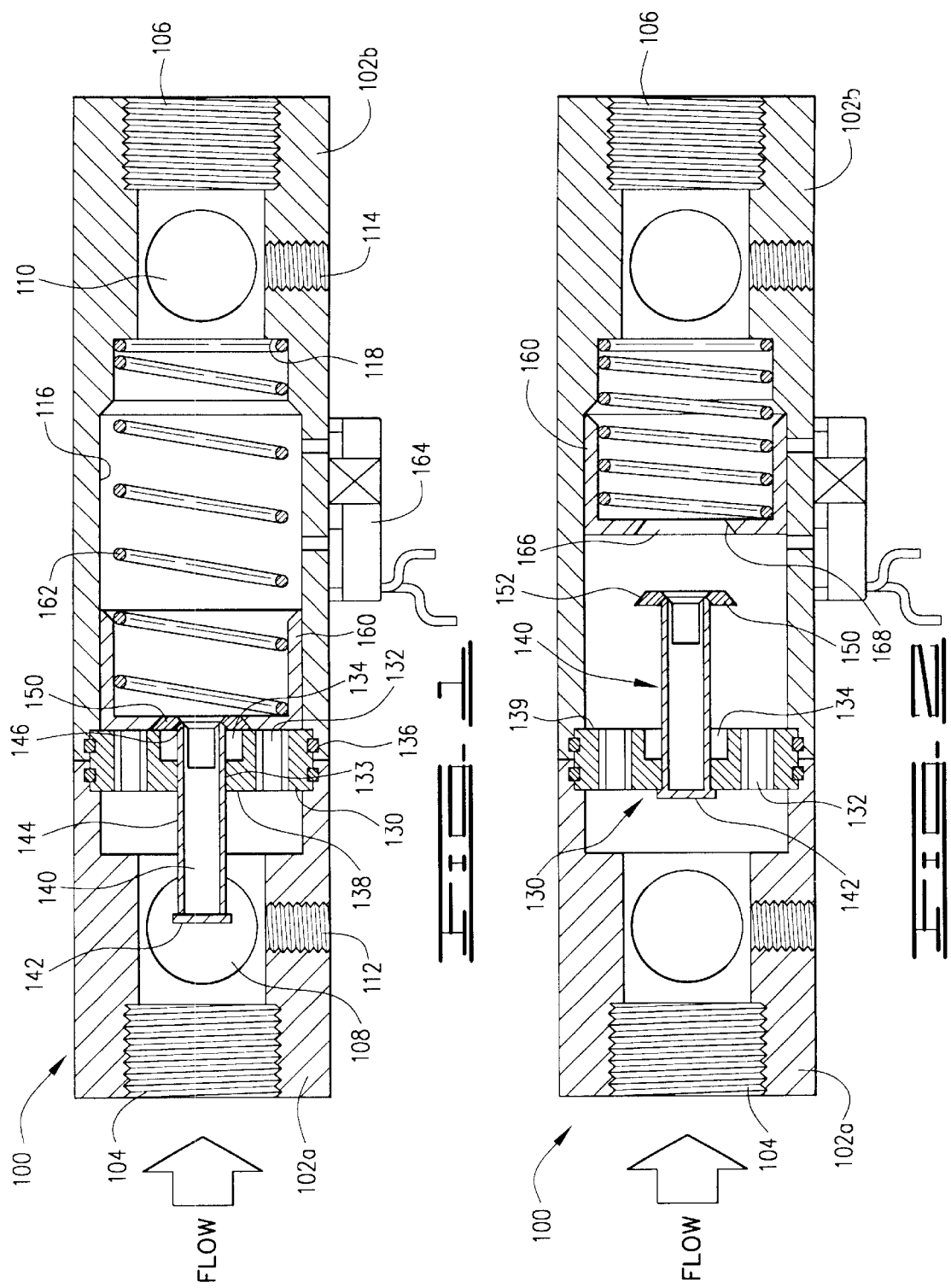

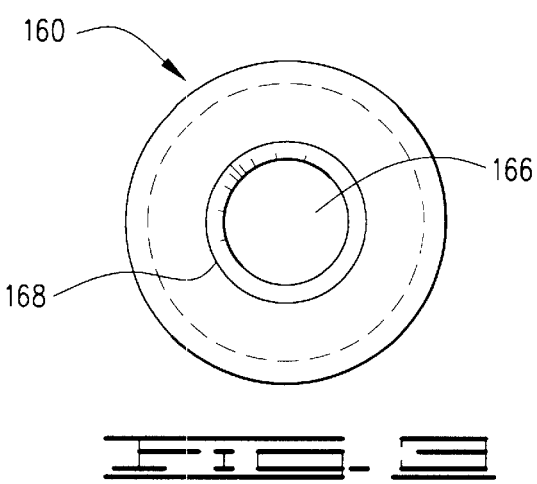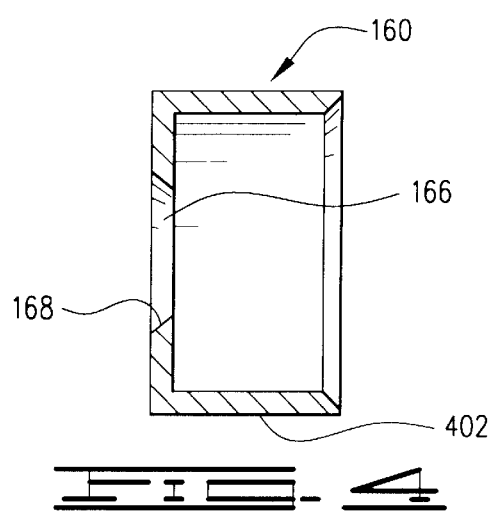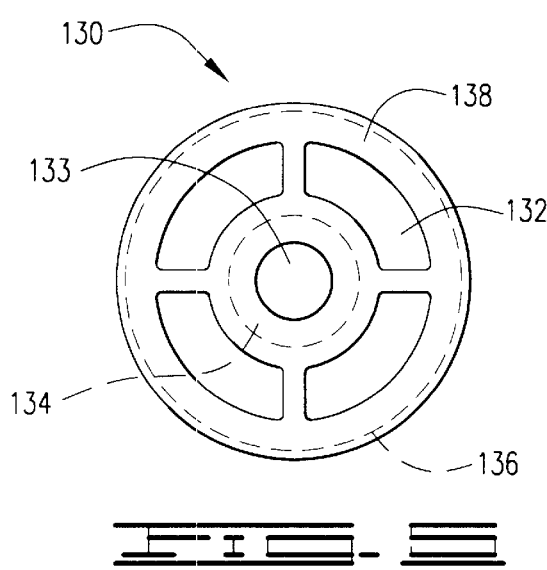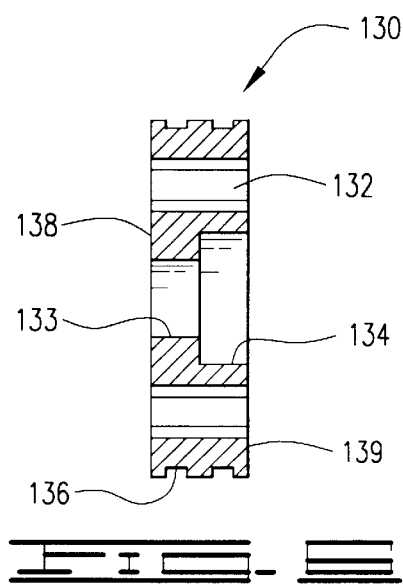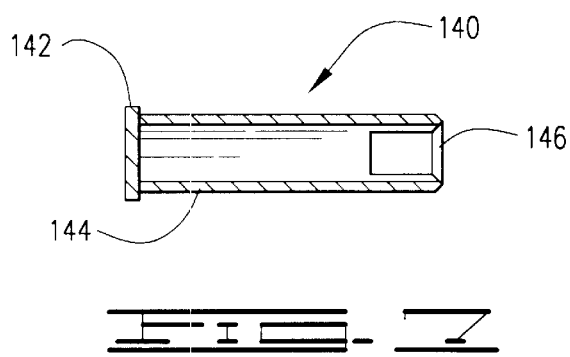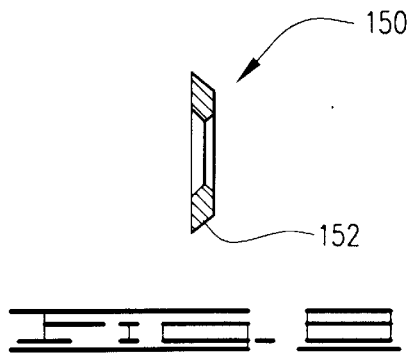

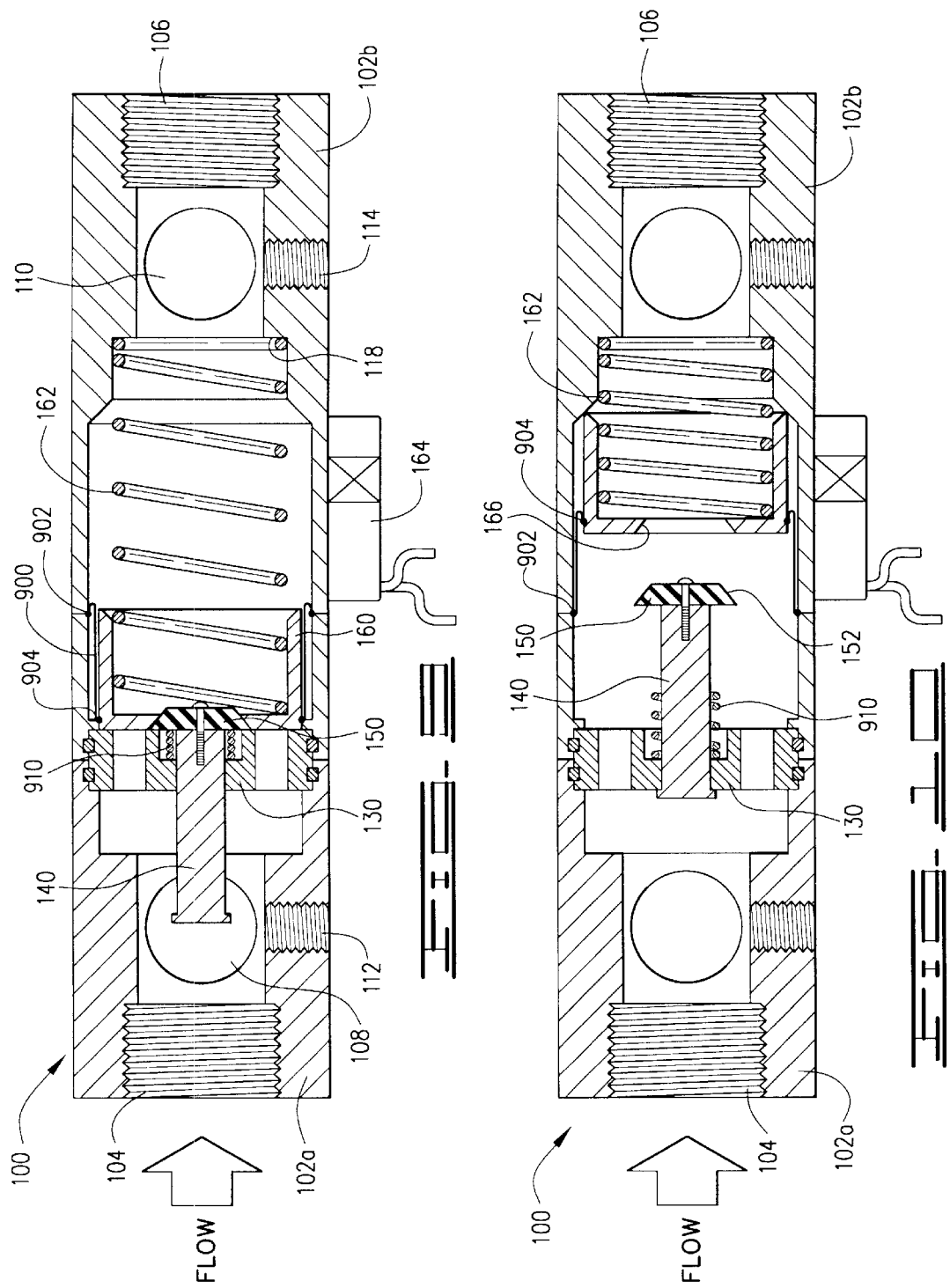

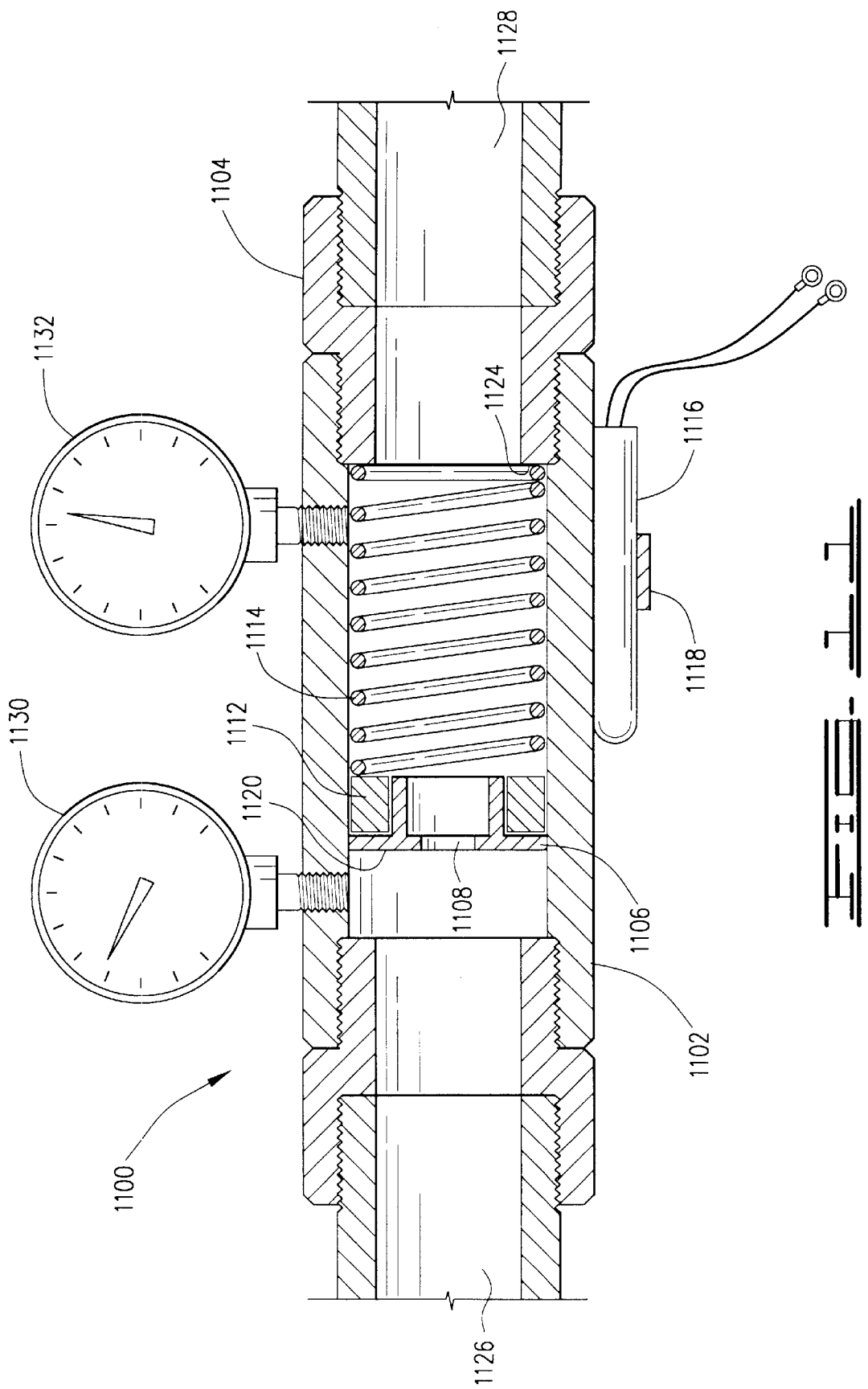

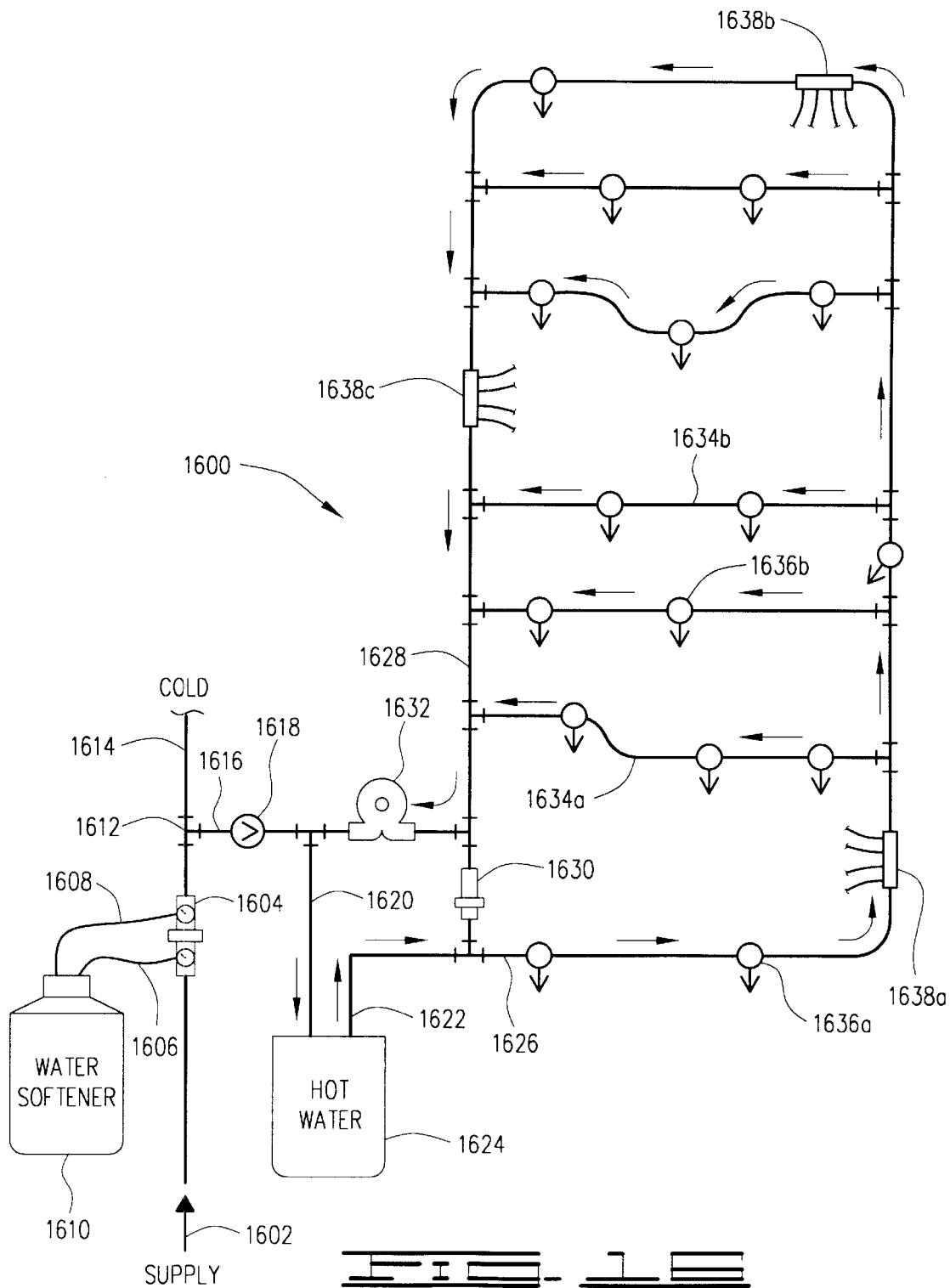

APPARATUS FOR FLOW DETECTION, MEASUREMENT AND CONTROL AND SYSTEM FOR USE OF SAME

CROSS REFERENCE TO RELATED APPLICATIONS

This application is a continuation-in-part of application Ser. No. 09/648,444 filed on Aug. 25, 2000 (abandoned, now application Ser. No. 10/118,207 filed Apr. 9, 2002), which was a continuation-in-part of application Ser. No. 09/567,510 filed May. 8, 2000, now U.S. Pat. No. 6,333,695 B2 issued Dec. 25, 2001, which is a continuation-in-part of U.S. patent Ser. No. 09/483,999, now U.S. Pat. No. 6,239,708, filed on Jan. 18, 2000, issued May 29, 2001, which was, in turn, a continuation-in-part of U.S. patent Ser. No. 09/098,976 filed on Jun. 17, 1998 now U.S. Pat. No. 6,081,196 issued Jun. 27, 2000 (hereinafter collectively referred to as the "Parent Applications").

BACKGROUND OF THE INVENTION

1. Field of the Invention

The invention relates to the fields of flow detection, measurement and control. The invention also relates to fire suppression systems, and, in particular, to multi-purpose piping systems for fire protection in structures and flow elements related thereto.

2. Description of the Prior Art

Practically any system where fluid flows in a conduit may use flow measurement devices. There are as many different kinds of flow measurement devices as there are systems where fluids flow in a conduit (such as a typical round pipe). For example, it is well known that there is a pressure drop across an orifice plate, and that this pressure drop can be used to determine the fluid flow through the pipe. The pressure drop is proportional to the velocity of the fluid in the pipe. As another example, a positive displacement device may be placed in a conduit, which directly measures the volume of fluid flowing there through. From the known volume measured by the positive displacement device, the velocity of the fluid in the pipe can be determined. Each type of flow measurement device has its strengths and weaknesses, and may be applicable to one system, while not being suitable for another.

Check valves (single and double acting) are also widely used in systems where fluids flow in conduits. The purpose of a check valve is to allow flow in one desired direction, but prevent flow in the opposite undesired direction. Existing check valves often use a moving seat, which is forced open by fluid flowing in the desired direction, but which moving seat is sealingly forced against an annular shoulder, preventing flow in the undesired, opposite direction.

It is well known to use electronic sensor means to transmit a signal generated by a flow measurement device to a read out or alarm means. The electronic output may be generated in response to a pressure transducer or the like. There are a myriad of ways to generate an electronic signal proportional to flow of a fluid in a conduit. As with our orifice plate noted above, the differential pressure is proportional to the flow in the conduit. Therefore, a differential pressure transducer exposed to the up stream and down stream fluids would produce an output electrical signal proportional to the flow of fluid through the conduit. In one type of paddle flow switch, the volume between the paddles is known, and a signal is generated indicating the number of revolutions per unit time of the paddle, thus allowing calculation of the flow velocity. Vane-type paddle flow switches are typically used in the fire protection industry, but vane-type paddle flow switches are generally not capable of measuring flow with any degree of accuracy. Gems® Sensors markets several types of flow switches in their catalogues, which switches use Reed switch technology to measure flow. These devices are equipped with a magnet which is displaced by liquid flow to actuate a hermetically-sealed Reed switch isolated within the unit body of the switch. A positive spring-return de-actuates the switch when flow decreases. The pressure drop is low since the flow sensing elements moves out of the flow path after switch actuation. With only one moving part - the shuttle, paddle, or piston - Gems Sensors' flow switches are alleged to be inherently reliable. There are no bellows, diaphragms, or mechanical linkages to wear or get out of adjustment. Gems Sensors' FS-200 incorporates a magnet-equipped shuttle, which is displaced by fluid flow, actuating the hermetically sealed Reed switch. Gems Sensors also provides options vane bypass, which can be opened to allow additional flow to pass through the sensor before the Reed switch is activated. This optional vane device is externally adjustable with a blade screwdriver, for simple adjustment of the amount of flow required to actuate the Reed switch. Gems Sensors' model FS-10798 incorporates a piston which provides an alternative flow path for fluid. In the main flow path, there is a vane which can be adjusted to vary the amount of fluid flow which is required to move the piston a sufficient distance to activate the magnetic switch. The piston is equipped, of course, with a magnet, which activates an external Reed switch when it is displaced sufficiently. Therefore, there is no flow through the alternative piston path until it is displaced sufficiently to allow fluid to flow through an outlet port in the cylinder wall in which the piston moves.

It is well known to provide a dual check back-flow preventer for use in various types of systems. For example, Watts Industries, Inc, provides a Series 007 Double Check Valve Assembly. The Watts device has two moving checks in series, which are displaced by flow in a desired direction, but which positively seat to prevent flow in the undesired direction. As the checks are displaced by flow in the proper direction, flow passes out around the periphery of the checks. The checks are contained within a cage assembly, which allows passage of fluid between the legs thereof.

It is well known to provide a bypass means for allowing fluid flow around a restriction, in certain circumstances. For example, as disclosed in the Parent Applications for use in a multi-purpose piping system, it may be desirable to divert flow around a water softener where the demand for water in the residence for fire protection is greater than is able to flow through the water softener. As another example, in a chemical process, chemicals may be passed through a reactor unit. However, should the reactor become plugged or otherwise unduly restrict the flow, it may be desirable to bypass the reactor so as to prevent damage to the reactor vessel and/or a process upset. In these circumstances, it is necessary to have a bypass means which can divert flow around the flow element causing the pressure drop.

In most fluid flow systems, each of the above noted flow elements (flow measurement, check valve, bypass means) is a separate fitting which must be placed in the fluid system. It is often desirable to combine as many of the above noted functions into one device engineered for a particular purpose. The benefits of a combination of multiple devices, for example the flow meter, check valve, and means for converting a fluid flow to an electronic out put signal, are: a reduced number of devices reduces complexity, cost, and difficulty of installation of a fluid flow system.

It is also well known to provide a means for enunciating an alarm when water flows through a fire protection system. Typical commercial fire protection systems do not have significant water flow there through unless a sprinkler head is activated by a fire. Thus, the typical commercial systems need only detect whether or not flow is present, and if so, an alarm must be enunciated. That is why vane-type paddle flow switches are generally acceptable for commercial fire protection systems.

U.S. Pat. No. 6,081,196, issued to Young on Jun. 27, 2000, for Apparatus and Method for Multipurpose Residential Water Flow Fire Alarm disclosed means for using the same piping for both domestic and fire protection needs. The method provided for a flow detection and measurement means which is capable of distinguishing typical domestic flow from fire protection flow caused by the operation of one or more sprinkler heads. The ability to distinguish domestic flows from fire protection was based on the different flow regimes between fire protection and domestic uses.

The National Fire Protection Association ("NFPA") has established standards for the design and operation of multi-purpose residential fire sprinkler systems. The standard is known as NFPA 13D, 1999 Ed. It defines a multi-purpose piping system ("MPS") as "[a] piping system within dwellings and manufactured homes intended to serve both domestic and fire protection needs."

Typical commercial fire sprinkler systems utilize a water flow detector to provide an alarm means. When a flow of sufficient, minimal, volume is detected, typical commercial systems indicate an alarm condition. The only reason that water typically flows in commercial systems is activation of a sprinkler head. Therefore, in a typical commercial system an alarm means need only determine whether or not water is flowing. Paddle flow switches are commonly used to determine when flow occurs in commercial systems. These are typically vane-type paddle flow switches.

In an MPS water regularly flows through the common piping. Flows occur to supply domestic needs within the structure. Whenever a sink, shower or toilet valve open, water flows in the MPS. Therefore, the alarm system used on typical commercial applications will not work for the MPS because simply taking a shower might cause a typical commercial flow detector to alarm when used with the MPS.

In light of this problem, typical residential and commercial applications have two completely different piping systems: (1) a fire sprinkler piping system, and (2) a domestic piping system. This doubles the number of pipes and fittings and the amount of plumbing work which has to be performed in a typical residential application. The same set of piping could not previously be used for both systems because the flow alarm could send false signals when domestic water was turned on. Alternatively, a residential application could use a fire detection system (i.e., smoke detector system). However, a smoke detection system does not alarm when water flows. Therefore, with a smoke detection system and no flow alarm, the fire sprinklers could run for days, causing extensive water damage, while the home owner is away on vacation and no alarm would sound. Also, smoke detection systems can be expensive.

As noted above, U.S. Pat. No. 6,081,196, issued Jun. 27, 2000, to Young, disclosed an Apparatus and Method for Multipurpose Residential Water Flow Fire Alarm. The apparatus for use as a multi-purpose residential fire suppression water flow alarm system disclosed in that patent was comprised of a supply side for delivering water under pressure; a multi-purpose piping system having a system side with common piping for delivering water from the supply side to a fire suppression side with one or more sprinkler heads and a domestic side for one or more domestic uses; a detecting means for detecting fire protection flow and for distinguishing that flow from a maximum domestic flow, the detecting means being disposed between the supply side and the system side; a drain test connection; and an alarm means. The method of utilizing the apparatus described above was also disclosed. One of the dependent claims from the above-noted patent claimed a detecting means comprised of an orifice plate through which water flows causing a differential pressure measured by a differential pressure switch so that the flow rate to the orifice plate is proportional to the differential pressure allowing a determination of flow rate based on the differential pressure measured.

The flow detection means could utilize any number of well known flow measurement technologies, such as U.S. Pat. Nos. 5,139,044 and 5,288,469 to Otten et al. Otten incorporates both an orifice plate and a cone-shaped plug around which the water flows. U.S. Pat. No. 5,419,203 to Carmichael discloses a device similar to the device disclosed by Otten. Otten utilizes the Hall Effect to measure the displacement of a displacement piston having a magnet incorporated therein. Carmichael utilizes strain sensors to measure the strain caused by displacement of a cone-shaped plug biased by a spring member. As the flow increases, the cone-shaped plug displaces backwardly in reaction to the flow putting greater pressure on the spring and consequently, greater pressure on the pressure sensors incorporated in the device. The Otten and Carmichael devices have several common features, namely a chamber having an orifice plate and a plug-shaped device adapted to be deflected away from the orifice plate in proportion to the flow rate through the chamber. The flow measurement means must be simple in both operation and concept so that it will be inexpensive to build and can be easily programmed and calibrated in the field. The problem with Otten and Carmichael is that their devices allow flow therethrough the instant pressure is applied across the orifice plate. As disclosed, they are not capable of serving as a bypass means for allowing flow only when the differential pressure exceeds some preset level.

Critics of the MPS have also noted that it is common for residential systems to incorporate a water softener or similar devices (such as filters, chlorination systems, UV purifiers and the like). Water softeners and similar devices can create substantial drops in system pressure and flow such that the water supply flowing through a typical residential system may not be sufficient for fire protection needs. Therefore, there is a need for a bypass mechanism which will allow sufficient flow in fire protection situations to bypass the water softener to supply the fire protection needs.

Prior art systems also suffered from problems with freezing. Where lines were in locations that could reach temperatures below freezing, it was a common problem to face freezing in the pipes, which could crack sprinkler heads and/or piping systems. Prior art systems addressed this problem in a number of ways, including dry pipe systems, which do not have any water in the piping until fire is sensed, by placing pipes in locations where they were not exposed to cold temperatures (for example, by placing insulation wrap over piping systems in favor of heated spaced below) and the like.

The NFPA allowed the MPS because, in their estimation, the cost savings associated with single systems instead of duplicate systems would cause the MPS to be installed in more homes, thus saving more lives. However, the NFPA provides no means for alarming upon a water flow condition in the MPS, which is a system where both domestic and fire protection systems use common piping.

There was previously no flow detection means for use with an MPS. As noted above, typical flow detection means alarm upon detection of a flow. Therefore, given the common piping system in an MPS, typical domestic uses could cause the prior art flow detection means to send an alarm signal to the alarm means. NFPA provided for installation of a non-water-flow-based smoke detection and alarm system for use with the MPS. These non-water-flow-based smoke detection and alarm systems are expensive, and they are not capable of detecting flow through one or more fire protection sprinklers. The inability of a smoke detection system to detect and enunciate a water flow alarm could result in extensive water damage to the property.

Parent Applications

The parent applications (application filed Apr. 05, 2000, application Ser. No. 09/450,535 filed Nov. 30, 2000, application Ser. No. 09/483,999 filed Jan. 18, 2000, and U.S. Pat. No. 6,081,196 issued 06/27/00) disclosed the MPS with a water flow alarm. Since they envisioned the MPS, common piping carried water throughout the system. After passing through the main control valve, water passed by a pressure gauge, then through flow detection means. In combination the flow detection means and the pressure gauge allowed for determination of whether the water supply is sufficient for fire protection needs. The flow detection means was connected to an alarm means which activated upon the detection of a flow rate greater than maximum domestic flow. Methods of detecting and measuring flow and alarming upon excessive flow are illustrated, for example, in Otten, et al., U.S. Pat. No. 5,228,469. Disposed after the detection means was a drain test connection. This drain test connection served the same purpose as it did in the prior art. The drain test connection also preferably included an orifice plate with interchangeable orifice plates for simulating different flow regimes. For example, one orifice plate could simulate the operation of a single fire sprinkler while another orifice plate simulated the domestic usage. These interchangeable orifice plates could then be used to calibrate the operation of the alarm means. Common piping carried water throughout the system to both domestic and fire protection uses. Rather than having distinct fire sides and domestic sides, the Parent Applications disclosed short sections of pipe split off from the common piping which were designated as either fire side or domestic side.

The Parent Applications also disclosed a flow sensor incorporating a combination orifice flow meter/displacement magnetic flow sensor in an annular housing. The annular housing was preferably be composed of a non-magnetic, metallic material, such as aluminum. Alternatively, the annular housing could be comprised of a polymer such as CPVC or similar materials. The material of construction was not critical so long as it did not interfere with the magnetic activation of the Reed switch. The annular housing had two ends, and at each end a bushing or reducer adapted to be threadedly (or by a socket) attached thereto to allow connection of an inlet pipe at an inlet end of the annular housing and an outlet pipe at an outlet end of the annular housing. A moving orifice plate, having a front face and a back face, was adapted to be received within the annular housing. The annular housing had at least one section with a continuous diameter defined therein for receiving the moving orifice plate. The moving orifice plate had a diameter which was slightly smaller than that of the continuous diameter section of the annular housing, allowing a sliding motion therein, but preventing excess fluid to flow around a periphery of the moving orifice plate. A moving plate opening was defined at or near the center of the moving orifice plate. An orifice plate magnet flange having a diameter larger than that of the moving plate opening was disposed on a back face. Disposed substantially around and outside the flange was a circular orifice plate magnet. The moving orifice plate was biased away from the outlet end by a orifice plate spring. The orifice plate spring was contained between an interior flange shoulder near the outlet end, and the orifice plate magnet. Mounted on an exterior portion of the annular housing was a Reed switch. The Reed switch was attached to the annular housing by an adjustable attachment means. Adjustment screws held the adjustable attachment means in place and allowed it to be loosened for movement of the Reed switch for calibration of the device.

The Parent Applications also disclosed another related embodiment of the combination orifice flow meter/displacement magnetic flow sensor. This embodiment was adapted to be used in systems where a water softener or similar pressure drop causing device is present or a pressure drop is to be detected. The outlet to the water softener was on the supply side of the sensor, and the inlet from the water softener was on the system side of the sensor. A "bullet rod" was held in place by a bullet port within the annular housing. The bullet port was comprised of an outer annular ring held in place between an annular shoulder and a bushing, support legs projecting inwardly from the annular ring, and an inner support ring. An open port area was defined between each of the support legs. Preferably, the sum of the open port areas was at least as large as the cross sectional area of the inlet pipe connected to the sensor, thus, the pressure drop through the device was minimized. A bullet rod having a head portion with a leading end and a threaded male end adapted to be received through the inner support ring was provided. A tail portion had a threaded female end adapted to threadedly engage the male end, so that the tail portion is held in place against the inner support ring. The tail portion also had a tapered end. The tapered end faced the outlet end of the sensor. The moving orifice plate opening was sized to receive the tail portion so as to allow sliding motion of the moving orifice plate and also to minimize flow between the tail and the orifice plate. Thus, as the moving orifice plate was displaced toward the outlet end by pressure drop, substantially all of the flow was diverted through the water softener until the pressure drop created by fire flow displaced the orifice plate past the tapered end, at which point water flowed through the orifice in the orifice plate. As discussed below, preferably two Reed switches were provided, the first for a trouble alarm, and the second for enunciating the alarm means.

Another embodiment of a fire protection system incorporating the apparatus is discussed below. The water from the water supply first flows through a flow sensor passing through an inlet softener line to a water softener or similar water treatment or processing device and thence through the outlet softener line back through the flow sensor. The operation of the flow sensor will be more fully described hereinafter, but for the present time it is sufficient to say that the flow sensor typically directs water through the inlet softener line through the water softener and then back through the sensor to a first pipe section. However, whether there is an excessive water demand in the system, for example such as one caused by the operation of a fire protection sprinkler, there is a mechanism incorporated in the flow sensor which allows water to bypass the water softener increasing the flow rate through the system. The water, which is passed through the water softener, is next split, some of it passing into the cold water piping, and the rest of it passing into a second pipe section.

Thence, water from the second pipe section passes through a second flow sensor. A check valve may also be incorporated in the second pipe section. The check valve prevents back flow of water, which potentially could be stagnant from the fire protection system, to the cold water piping and/or the water softener. The second flow sensor passes water down through a water heater via an inlet heater line, and back to the sensor via an outlet heater line. Again, the second flow sensor incorporates a bypass means which allows water to bypass the water heater where there is an excessive demand. After being heated, the water passes into a multi-purpose pipe section. Attached to the multi-purpose pipe section are typical domestic uses such as a shower head and a faucet. Other uses, such as toilets, dishwashers, washing machines, and the like may also be attached to the multi-purpose pipe section. Also in communication with the multi-purpose pipe section are one or more sprinkler heads. The sprinkler heads are in communication via a passive pump and a head fitting with a multi-purpose pipe section. The operation of the passive pump in cooperation with the head fitting and the sprinkler heads will be more fully described hereinafter. However, the purpose of the passive pump is to utilize the velocity head of water flowing through the multi-purpose pipe section to circulate water to and around the sprinkler heads to minimize stagnation thereat.

From the passive pump, water is passed to a head fitting. The water passes to the head fitting from the multi-purpose pipe section via the head supply line. It is returned to the multi-purpose pipe section via the head return line. A reverse-j fitting supplies water from the head fitting to the sprinkler head. The purpose of the reverse-j fitting is to cool the water supplied to the sprinkler head to insure that the sprinkler head is not activated by the temperature of the water supplied thereto. Most sprinkler heads are set to activate at a temperature of 155° Fahrenheit. While it is not anticipated that hot water flowing through the multi-purpose piping system will exceed that temperature (most hot water heaters have a 140° Fahrenheit maximum temperature), the reverse-j fitting helps insure that, just in case the water does exceed that temperature, the fire sprinkler is not inadvertently activated by water passing thereto.

As shown, a thermocouple in communication with the pump controller and control wiring operates to ensure that a minimum desired temperature is maintained in the common piping. The thermocouple measures the temperature of water in the common piping. If the measured temperature drops below a pre-selected level (preferably at least 40° Fahrenheit), the pump controller initiates the action of a pump. The measured temperature may be a water temperature in the system preferably remote from the utility room where the heater is located. Alternatively, the temperature may be an air temperature or a combination of air and water temperature measurements. The pump draws water from the common piping via a pump inlet pipe. A pump outlet pipe directs water through a check valve and a return pipe so that it is recycled through the water heater. The return pipe connects to the inlet heater line to complete the circuit. Thus, water moved by the pump through the water heater is reheated to maintain a minimum temperature in the multi-purpose pipe section.

An alternative embodiment includes a return leg supply pipe and a return leg flow sensor. The return leg supply pipe may be in communication with the first pipe section. The return leg flow sensor normally prevents any water from flowing directly from the first pipe section through the return leg supply pipe into the multi-purpose pipe section. However, when an excessive water demand is made on the multi-purpose pipe section, the pressure may drop low enough so that the return leg flow sensor (without an alarm means) allows water to pass there through directly from the first pipe section, bypassing the flow sensor and the other elements of the water heater system. Alternatively, the return leg flow sensor may draw water from the multi-purpose pipe section at a point adjacent to the outlet from the flow sensor. This creates an alternative flow path for hydraulic advantage in the design of the system.

To reiterate, one of the problems to be solved by the Parent Applications was provision of a water-flow-based means of alarming the MPS. In the past, such systems had to utilize two completely different piping systems: one for domestic uses and one for fire sprinkler system uses. Previous alarms used in these systems were designed to create an alarm condition upon the detection of a flow (commonly 8–10 gpm). As noted previously, vane-type switches are very inaccurate in determining flow rate. Typical domestic flows could have caused an alarm in a prior art system. Alternatively, prior art systems used a smoke detection and alarm system which did not have a flow detector. These systems without a flow detector risked substantial water damage to the structure if a sprinkler head activated while no one was in the home.

The Parent Applications used the principle that domestic flow rates are much lower than flow rates needed for fire protection. Using a flow detection means, it was possible to create an alarm condition only upon detection of flows which are such as created by fire protection needs. Thus, an alarm condition was not created when typical domestic uses only were detected.

Preferably, the Parent Applications also incorporated a tamper detection means on the main control valve. The tamper protection means determined whether the main control valve was closed, and if so, enunciating a trouble alarm. A pressure gauge was also preferably provided in the system.

The combination orifice flow meter/displacement magnetic flow sensor disclosed in the Parent Applications could have two normally open Reed switches disposed thereon for detecting flow as indicating by displacement of the moving orifice plate. The first Reed switch was the same as previously disclosed, and enunciates a trouble or fire alarm via the fire alarm means. Preferably, the first Reed switch also activated a system which contacts emergency response personnel, such as fire departments. In addition to the fire alarm Reed switch, a second Reed switch may be provided. The second Reed switch enunciated a first stage "trouble alarm". Preferably, the first stage trouble alarm only enunciated within the structure (i.e., emergency response personnel were not contacted). The trouble alarm was created if the domestic usage was excessive. Where the system was used with the MPS, the first stage alarm would naturally cause anyone in the residence to instinctively shut off water, for example a shower they may be taking. As another example, if a resident heard a first stage alarm, and they were washing dishes, they would most likely shut off the sink faucet. This natural reaction to the first stage alarm may reduce the water flow demand below the level where the first stage alarm enunciates, eliminating the alarm condition. The first stage Reed switch is displaced a slight distance toward the inlet of the flow sensor relative to the fire alarm Reed switch. Thus, as the moving orifice plate is displaced towards the outlet end of the flow sensor, it will first activate the first stage Reed switch, enunciating the internal first stage trouble alarm. As the orifice plate continues to be displaced towards the outlet end, it will next activate the fire alarm Reed switch, which enunciates the alarm means, preferably notifying emergency response personnel. The relative linear displacement of the fire alarm Reed switch and the trouble Reed switch was to be set in the field so that there was sufficient differential in the flow which activates the first stage alarm and the fire alarm to give residents or occupants of the structures sufficient time to shut off domestic demands before a fire alarm is created. This two-stage system also serve as a safety back up, because if one of the alarm stages fail, the other still alerted residents to the potential alarm condition.

Though the Parent Applications described the inventions therein with reference to a multi-purpose piping system, it should be understood that the system could be used with any flow-based system. Further, the flow detection means disclosed could be used with any flow system, not just fire protection systems. That is, the flow detection means are capable of detecting the flow of any fluid through a piping system. The piping system could carry hydrocarbons, solvents, or any other liquid or potentially even gaseous materials for that matter.

In operation the apparatus disclosed in the Parent Applications functioned as both a domestic water supply system and a flow detection and alarm system. Under normal conditions, the water flow rate through the flow detection means did not reach the fire suppression flow rates. When one or more sprinkler heads activated, the flow detection means detected the increased flow and sent an alarm to the alarm means. The alarm means enunciated a visible and/or audible alarm indicating the alarm condition. It is well known in the prior art to activate a telephone modem-based system for calling, for example, the fire department, upon detection of an alarm condition. See, e.g., Otten, U.S. Pat. No. 5,139,044. It was preferable to incorporate such a modem-based component in the present invention to notify the fire department and other emergency contacts should a fire alarm condition be detected. If one or more domestic cutoff valves were included in the apparatus, the flow detection means also sent a signal to activate the domestic cutoff valves, shutting off water to one or more domestic uses and providing more water for the fire sprinklers.

When the two-stage alarm system was provided, it was necessary to calibrate both the first stage trouble alarm Reed Switch and the second stage fire alarm Reed switch. The preferred method was to first calibrate the fire alarm Reed switch. The calibration was very simple. First, the drain test connection is opened to simulate fire protection needs, the connection means for the Reed switch were loosened, and it was moved towards the inlet end of the sensor until an alarm condition was created. The first stage Reed switch was then moved a slight distance further towards the inlet end. A typical domestic demand was then created by using the drain test connection or flowing water from some number of plumbing fixtures. As the flow through the drain test connection exceeds the high end of the expected domestic demand, the first stage Reed switch should be activated, activating a first stage trouble alarm. If the alarm is not activated, the first stage Reed switch is moved further towards the inlet end of the sensor.

The Parent Applications also disclosed a flow sensor which can either serve as a single or double check valve. A moving seat, in cooperation with the moving plate, provided two back-flow prevention means. When water moves through the flow sensor in the desired direction, the moving seat allows water to pass thereby, and when sufficient water flows through the sensor, the moving orifice plate is displaced so that water can pass through the orifice therein or around the periphery of the plate. When water flows in the undesired direction, the moving seat is biased to cause a sealing action of a check o-ring against a check shoulder seat. Similarly, the moving orifice plate is biased so as to create a seal between an outer seat and an outer orifice o-ring, as well as between an inner seat and an inner orifice o-ring. Thus, in combination, the moving seat and the orifice plate provide a double check. Incorporating the double check technology, a single flow sensor can serve as a flow measurement device, a double check valve, a bypass means, a flow and pressure gauge or ports, as well as creating an electronic output signal for enunciating an alarm or the like.

Also disclosed was a fire protection piping system having a water supply, a means for heating water, at least one fire protection sprinkler, a common piping means for receiving water from the supply, passing it through the heating means and delivering it to at least one fire protection sprinkler, and circulating means for circulating water through the common piping back to the heating means to maintain a specified minimum temperature in the common piping. By providing these elements, the danger of water freezing in the common piping is eliminated. In one embodiment, the circulation means comprises a pump controlled by a temperature measurement means for determining when the temperature of water in the piping drops below the minimum temperature specified. The controller engaging the pump which re-circulates the water in the piping through the heating means once the temperature drops below the desired level. At the same time, the recirculating of hot water through the system also eliminates the problem of stagnation. Preferably, at least one domestic uses is also supplied with hot water by the common piping, giving homeowners have the added benefit of instant hot water from a faucet or the like.

The flow sensors disclosed in the Parent Applications incorporate at least a single stage means for enunciating an alarm. The flow sensor may incorporate as many as three or more levels of alarm for the taking of various actions by the system upon the detection of the specified level of flow required to enunciate the alarm.

A means to compensate for pressure drops in a typical MPS was provided. More particularly, typical pressure drops include, but are not limited to, a water softener which may be placed in line in the system. Water softeners are typically used in multi-purpose systems to improve the quality of water for domestic use in the residence. In addition to water softeners, pressure drops may include filters, UV treatment of water, and the like. There are many reasons why people want to treat water coming into their homes for domestic purposes. Many of these treatment means will reduce the pressure of the water through the MPS system. Thus, there may be a need for fire protection flows to bypass these pressure drops in the system, or to at least compensate for them. Pressure drops were accommodated by providing a bypass means. In typical domestic flow situations, the entire flow of the water supply should pass through the treatment method in question, such as a water softener. However, when the system side pressure drops below a set level, a relief allows additional flows through a lower pressure drop path.

A system for providing circulation of water around fire protection sprinklers, the system comprising, common piping carrying water, which water is caused to flow at periodic intervals; a head fitting receiving a fire protection sprinkler therein and further defining a chamber therein in communication with the sprinkler; supply and return lines for supplying water to and returning water from the head fitting; and a pump means for using the velocity head created by water flowing through the common piping to pump water to the head fitting causing circulation there through as a result of and in cooperation with flow through the common piping, was disclosed. The circulation systems requires no mechanical input. That is, no pumps or motors are required for the pumping system. However, it is anticipated that in some cases it may be desirable to use a mechanical pump based on either electrical, air, or similar power means. In those cases, the pump will not rely solely on the velocity head of water flowing through the common piping.

An integrated system incorporating the above-noted elements of the invention and having a two-stage alarm for enunciating a pre-alarm, as well as a full-blown fire alarm, was disclosed. The integrated system has two detectors, the first detector enunciating a trouble alarm when a specified flow is created, and if the flow further increases, a second detector enunciating a fire alarm, which also preferably calls emergency response personnel. The first trouble alarm is audible only in the residence or structure where the system is deployed. Preferably, as noted, the second fire alarm will contact emergency personnel, possibly via a telephone modem-type connection. The integrated system also preferably incorporates a tamper switch on a valve incorporated in the system to shut off the flow thereto. The tamper switch will enunciate if water flow to the fire protection system is shut off.

It is a further object of the invention to provide a system for use in a commercial application which meets the heating/cooling needs of the structure, as well as the needs for fire protection. The integrated system uses one set of piping to provide re-circulated water for heating/cooling, as well as to provide water for fire protection purposes. A water flow alarm is provided in the system using one of several means to determine whether a fire sprinkler has been activated.

Finally was disclosed in the Parent Applications a system which can be used as a water flow monitor when a structure is unoccupied. That is, using the flow sensor apparatus in cooperation with a standard structural alarm system, it is possible to create a water flow alarm which will indicate when there is a probable leak in a structure. The structure alarms in question typically have three modes of operation: a first mode where the structure is occupied, and the alarm is not armed; a second mode where the structure is occupied, but the alarm is activated with a relatively long time delay alarm; and a third mode where the structure is unoccupied. The water monitor alarm operates with a short time delay alarm when the alarm system is in the third mode, indicating that there should be little or no water usage within the structure.

Shortcomings of Sensors Disclosed in the Parent Applications

Testing of the flow sensor disclosed in the Parent Applications having a bullet rod and a moving orifice plate revealed that a large percentage (on the order of 30%) of the flow therethrough was not bypassed through the water softener or similar device. Rather, a large percentage leaked around the outer periphery of the moving orifice plate or between the bullet rod and the orifice. Such water leaking through the device reduced the percentage of water actually passing through the softener and, as a result, the water in a structure using the prior art device would not have truly been "soft." Therefore, it can be seen that there is a need for a more effective seal both around the periphery of the moving orifice plate and between the orifice and the bullet rod.

Further, the requirement of a magnet inside the sensor to interact with the external Reed switches, raised concerns about collection of metallic particles on or near the magnet, possibly preventing the orifice plate from moving as needed. Therefore, it can be seen that there is a need for a means for sensing movement of the orifice plate which does not require a magnet inside the flow path of the sensor.

Prior systems incorporating sensors in multipurpose systems generally assumed that such sensors would be field adjustable. Field adjustability is desirable because it allows an installer to customize the sensor for each installation's supply pressure and other characteristics as well as for the specific nature of domestic and fire protection demands. However, field adjustability also presents problems because improper installation could present life-threatening danger. Therefore, it may be desired to market a non-field-adjustable version of a multipurpose system to simplify installation, decreasing the chance that such systems will not function properly when needed.

SUMMARY OF THE INVENTION

It is therefore an object of the invention to provide an improved apparatus for flow detection and measurement which overcomes the shortcomings of the prior art. It is also an object to provide a method for using the disclosed apparatus in fire protection and/or plumbing systems. The method uses the improved apparatus to overcome one or more of the disadvantages of prior systems.

It is an object of the present invention to provide an improved apparatus for flow detection, and measurement. The apparatus includes a moving orifice plate, a sensor means, a biasing means, and an improved sealing means for preventing flow through the sensor until a specified differential pressure between the sensor's inlet and outlet ports is reached. The apparatus for flow detection and measurement can incorporate a bypass means for allowing additional flow to pass through the flow measurement device as needed. When water is allowed to flow through the bypass means, an alarm may be enunciated should the flow reach a specified low-flow level. For example, the objects of the apparatus may be accomplished by providing a moving orifice plate with a magnet moving in cooperation therewith. The magnet activates a Reed switch on an external surface of the flow sensor when the moving orifice plate is displaced a sufficient distance by the flow passing through the sensor. When the water demand exceeds that which can flow through the primary path, the moving orifice plate is displaced beyond bullet rod allowing flow through the orifice. Improved means for sealing between the outer periphery of the moving orifice plate and an inner wall of the sensor body and between the orifice and the bullet rod are provided.

The use of a "steel sensor" and a non-magnetic ferrous moving orifice plate is also disclosed. No magnet is needed inside of the sensor's flow path when a steel sensor is used. Rather, the steel sensor is mounted on the outside of the sensor body; when the ferrous moving orifice plate moves to a set point, the steel sensor detects the presence of the moving orifice plate. A small, weak magnet inside the steel sensor is drawn toward the moving orifice plate as it approaches the steel sensor, activating the sensor. Thus, the position of the moving orifice plate can be monitored without the need for a magnet in the flow path.

A system incorporating a pressure regulator on the incoming supply line is disclosed to obviate the need for the sensor to be field-adjustable. Adding a pressure regulator ensures that a uniform supply pressure is applied to the system.

However, field installers must still certify that the minimum required supply pressure (preferably at least 60 psi) is available from the supply. If sufficient pressure is not available, the system may not function as intended.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

BRIEF DESCRIPTION OF THE DRAWINGS

In the drawings:

FIG. 1 is a cross-sectional view of one embodiment of the improved flow sensor in a closed position.

FIG. 2 is a cross-sectional view of the same embodiment of the improved flow sensor in an open position.

FIG. 3 is a detail front view of a moving orifice plate for use in the improved flow sensor.

FIG. 4 is a detail side sectional view of the moving orifice plate.

FIG. 5 is a detail front view of the bullet rod port.

FIG. 6 is a detail side sectional view of the bullet rod port.

FIG. 7 is a detail side sectional view of the moving bullet rod.

FIG. 8 is a detail side sectional view of the orifice sealing plate.

FIG. 9 is sectional side view of the sensor of FIG. 1 further incorporating a convoluted diaphragm to seal between the outer periphery of the moving orifice plate and the inner surface of the sensor body.

FIG. 10 is a sectional side view of the sensor of FIG. 2 further incorporating a convoluted diaphragm to seal between the outer periphery of the moving orifice plate and the inner surface of the sensor body.

FIG. 11 is a sectional side view of a prior art sensor without a bullet rod showing optional gauges attached.

FIG. 16 is a schematic view of a warm water circulating system incorporating the improved apparatus of the present invention.

DESCRIPTION OF THE PREFERRED EMBODIMENTS

Figure 12:
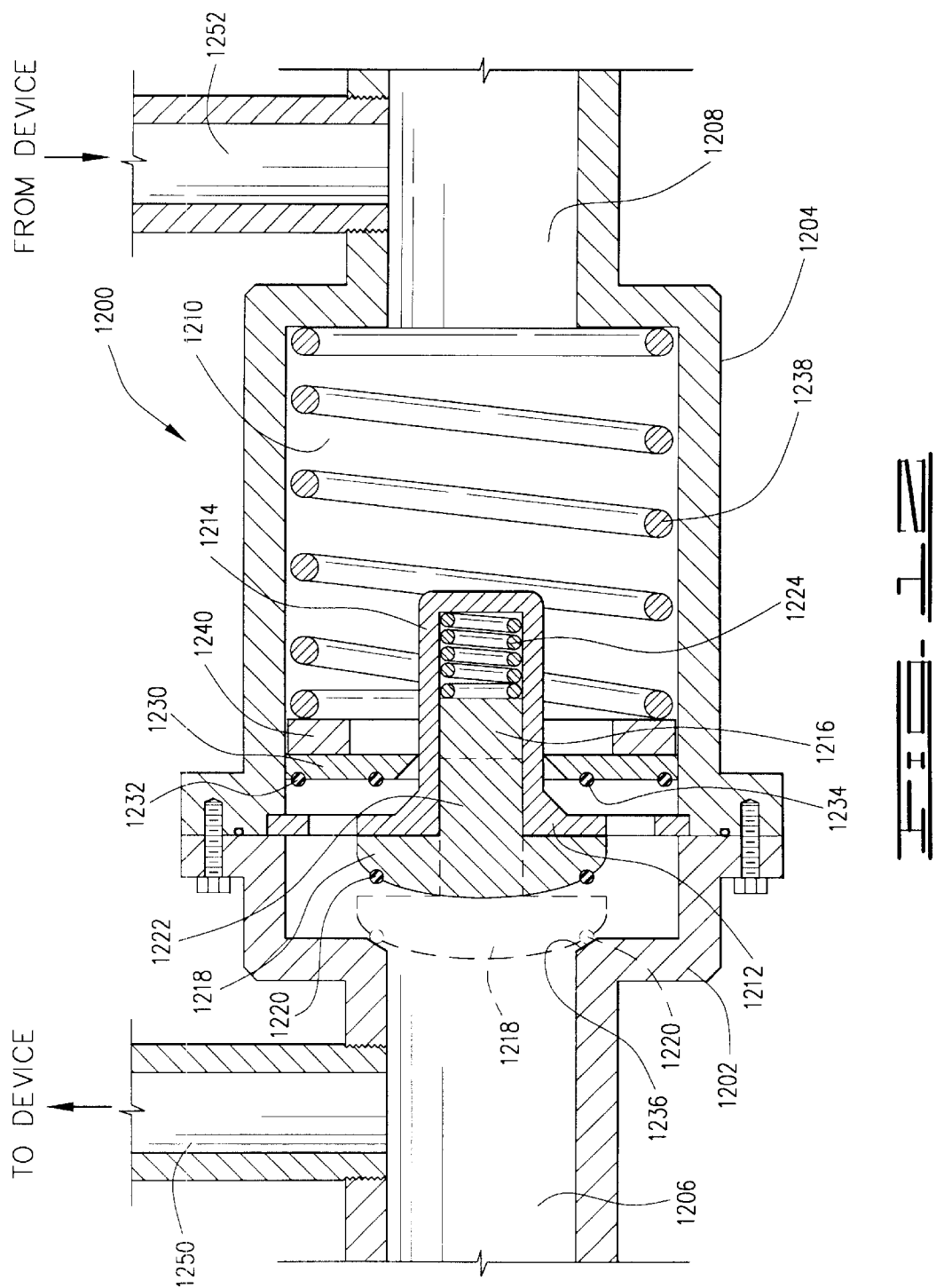
FIG. 12 is a sectional side view of a prior art sensor having incorporating a bullet rod and further functioning as a double check valve.

A flow sensor, from which the flow sensor disclosed herein is an improved version of a sensor disclosed in U.S. patent application Ser. No. 09/483,999, filed Jan. 18, 2000. That application disclosed a flow sensor, which could be used with a multi-purpose piping system for a fire suppression system/domestic water supply system in a structure. The device was disclosed as being used in a fire protection system, but it was noted that the sensor could be used in any flow measurement situation as well as in situations where a bypass means was desirable. The device disclosed more fully hereinafter, is intended to, and certainly can, be used in any appropriate flow measurement situation. For example, in a petrochemical facility, materials may be passed through a reactor unit to cause a change in their chemical structure. However, should the reactor become plugged, it may become desirable to have a bypass mechanism which allows the petrochemical to be vented to an emergency flare system, rather than causing a rupture or other failure of the reactor vessel. Such an application would be an appropriate use for the present flow sensor.

Sensors designed according to the related prior art generally have a moving plate means, a sensor means, and a biasing means. In addition to the above-noted elements, the sensors may have a sealing means for preventing flow through the sensor until a specified differential pressure is reached. The sealing means may generally be a bullet rod received within an orifice defined in a moving plate, or it may be a cylinder which slidingly and sealingly receives the moving plate means, which cylinder is closed for a portion of its length, and open for another portion of its length to allow flow therethrough.

The sensor means will be more fully described hereinafter. The sensor means may be a magnet in cooperation with a Reed switch. The sensor means may also be a plurality of electrical contacts, a pressure transducer engaged with the biasing means for measuring the pressure caused by the displacement of the moving plate, or use of the spring itself as a resistance coil, which coil has resistance that changes in proportion to its compression. Preferably, the sensor means will comprise a steel sensor in cooperation with a ferrous moving orifice plate. The scope of the invention is intended to incorporate well-known technology for measuring the displacement of the moving plate. Such technologies include, but are not limited to those noted above.

A prior art device similar to the present improved sensor is shown in FIG. 11. The sensor 1100 has an annular housing

1102. A bushing 1104 is adapted to be received at the outlet end 1128 of the flow sensor apparatus. The bushing defines a shoulder 1124, the use for which will be described more fully later. Disclosed within the annular housing 1102 is a moving orifice plate 1106. The moving orifice plate defines an opening 1108 (orifice) therein. Disposed about a periphery of the orifice plate is a magnet 1112. Alternatively, the moving orifice plate 1106 itself may be a magnet. A spring 1114, also referred to as a biasing means, biases the magnet 1112/moving orifice plate 1106 toward the inlet end 1126 of the apparatus 1102. A detector 1116 is held on an outside surface of the flow sensor apparatus by an adjustable attachment means 1118. As shown, the sensor incorporates a pressure gauge 1130 and a flow gauge 1132 which reads out a flow rate with proper calibration. Pressure sensors may be located on the shoulder 1124 in physical contact with the spring 1114. As the spring is biased backwardly by fluid flow therethrough, it places additional pressure on the sensors. The readout proportional to that pressure can be communicated to a controller, and the readout is directly proportional to the flow rate through the device. Alternatively, a current can be passed through the spring on a consistent basis. As the compression of the spring changes, its electrical resistance will change as well. The change in resistance is proportional to the compression of the spring, indicating the displacement of the moving orifice plate. Thus, the resistance of the spring can be directly related to flow through the device. As noted above, there are numerous other sensor means which could be used to determine the displacement of the moving orifice plate inside the annular housing. Such well-known technologies are intended to be incorporated within the spirit of the present invention.

A prior art double check flow sensor 1200 is generally shown in FIG. 12. It is comprised of substantially a first housing portion 1202 and a second housing portion 1204. At an end of the first housing portion 1202 is a main inlet port 1206, and a main outlet port 1208 is disposed at an end of the second housing portion 1204. In cooperation, the first housing portion 1202 and second housing portion 1204 define a chamber 1210 therein. Disposed in the chamber 1210 is a bullet port 1212 integrally connected to a bullet rod 1214. The bullet rod 1214 defines therein a cylinder 1216. A moving check 1218 has a check piston 1222 which is slidingly received within the bullet cylinder 1216. A check o-ring 1220 is disposed on the moving check 1218 for sealing against the check shoulder seat 1236. A check spring 1224 disposed in the bullet cylinder 1216 biases the moving check 1218 towards the check shoulder seat 1236. Disposed between the bullet port 1212 and the main outlet port 1208 is a moving orifice plate 1230. On the moving orifice plate 1230 are an outer orifice o-ring 1232 and an inner orifice o-ring 1234. An orifice spring 1238 biases the orifice plate 1230 in cooperating a magnet 1240 towards the main inlet port 1206, and away from the main outlet port 1208. As shown, the sensor 1200 includes a device outlet port 1250 and a device return port 1252. These ports allow the sensor to normally divert flow through an external device such as a water softener, ut to allow bypassing the device when there is a demand that exceeds the flow capacity of the device.

Preferably, the spring 1238 has a sufficient resistance to compression that it maintains the orifice plate 1230 in firm contact with the bullet port 1212, preventing any flow therethrough until a specified pressure drop is placed on the device. For example, it may be desirable to have a pressure drop of ten pounds before any fluids can pass through the sensor. In that case, the spring 1238 might maintain the orifice plate 1230 in firm sealing contact with the bullet port 1212 until a pressure of eight pounds, for example, is noted. Thus, the orifice plate 1230 would not begin to move away from the bullet port until at least eight pounds of pressure drop was placed upon it. This feature is desirable because there is a slight bypass around the periphery of the orifice plate 1230 and around the interior of the orifice plate once it moves away from sealing contact with the bullet port 1212. This bypass may be from five to fifteen percent, but it does result in some non-softened water bypassing the system and proceeding on to domestic or other uses.

As shown in FIGS. 1 and 2, the improved sensor of the present invention comprises a body including a first body portion 102a and a second body portion 102b. The first body portion 102a defines therein an inlet port 104, a bypass outlet port 108, and a gauge port 112, all in fluid communication; similarly, the second body portion 102b defines an outlet port 106, a bypass inlet port 110, and a second gauge port 114, all in fluid communication with one another and in indirect communication with the ports of the first body portion 102a. At the points where the body portions meet, they define an annular ring 118 for receiving a bullet port 130. The second body portion defines a shoulder 118 at a terminal end, thereof, near the outlet port 106.

A bullet port 130 is sealingly received within the annular ring 118. The bullet port is shown in detail in FIGS. 5 (front) and 6 (side section). The bullet port defines at least one fluid port 132 therein passing from the front face 138 to the back face 139 and further defines a central port 133 for receiving a moving bullet rod 140 therethrough. A sealing ring 134 may be located adjacent to the central port 133 for sealing and sliding engagement with the bullet rod 140. O-rings 136 are provided where the bullet port 130 engages the annular ring 118 to provide a fluid seal.

A bullet rod 140, shown in detail in FIGS. 7 and 8, is slidingly received within the central port 133. The bullet rod has a flared end 142 facing the inlet port 104, a smooth cylindrical body 144, and a terminal end 146. The flared end stops the movement of the bullet rod 140 when it engages the front face 138 adjacent to the central port 133. The terminal end 146 fittingly receives an orifice seal 150 thereon.

A moving orifice plate 160, shown in detail in FIGS. 3 and 4, is slidingly received within the smooth internal bore 116 between the bullet port 130 and the shoulder 118. The moving orifice plate 160 defines an orifice 166 therein at its center. The orifice has a tapered internal bore 168; a converse tapered periphery 152 of the orifice seal 150 is adapted to sealingly engage the tapered bore 168. The moving orifice plate 160 is biased toward the inlet port 104 by a spring 162. As noted in the Parent Applications, the spring could be replaced by other well-known means for biasing a part in a desired direction.

A detector 164 is disposed on an exterior surface of the second body portion 102b to sense the location of the moving orifice plate 160. The detector 164 could, as noted above, be a Reed switch if the moving orifice plate 160 is magnetic or has a magnet attached thereto. Other means for creating a signal proportional to the location of the moving orifice plate were discussed above. Alternatively, the detector 164 could be a steel sensor. The steel sensor is a product of Hermetic Switch, Inc. of Chickasha, Okla. The use of the steel sensor allows the removal of the magnet from the fluid flow path as noted in the Parent Applications. Concerns have been raised in the evaluation of the flow sensors specified in the Parent Applications that the magnet in the flow path might cause problems with the collection of metallic debris/deposits. Eliminating the magnet from the fluid flow path eliminates this concern. The elimination of the magnet from the flow path may also reduce production costs since, for example, the magnet will not need to be coated to prevent rusting. Further, the elimination of the magnet from the flow path may allow the size of the device to be reduced.

FIG. 1 shows the moving orifice plate 160 in a "closed" position, and FIG. 2 shows it in an "open" position. That is, when the moving orifice plate 160 is in the position show in FIG. 1, effectively no fluid passes through the smooth internal bore 116 of the second body portion 102b. Rather, flow is diverted out through the outlet bypass port 108 thence through external piping back into the inlet bypass port 110. However, when flow through the sensor 100 causes a certain pressure drop therethrough, the moving orifice plate is displaced far enough so that the orifice seal 150 disengages the orifice 166 allowing fluid to flow through the orifice. The disengagement is caused by the movement of the bullet rod 140 being stopped by the engagement of the flared end 142 with the bullet port 130.

An additional improvement to the sensor 100 is shown in FIGS. 9 and 10. The basic elements of the sensors shown in FIGS. 9 and 10 are the same as in FIGS. 1 and 2. However, a convoluted diaphragm 900 is provided to prevent any fluid from passing between the orifice plate 160 and the smooth internal bore 116. The diaphragm 900 is attached to the smooth internal bore 116 at a first connection point 902 and to the moving orifice plate 160 at a second connection point 904. Between the connection points is a flexible membrane impenetrable by fluid—a "convoluted diaphragm." The basic principle of operation of a convoluted diaphragm is well-explained at Plast-O-Matic Valves, Inc.'s web site (www.plastomatic.com/seals.html), the text and drawing from which is reproduced below.

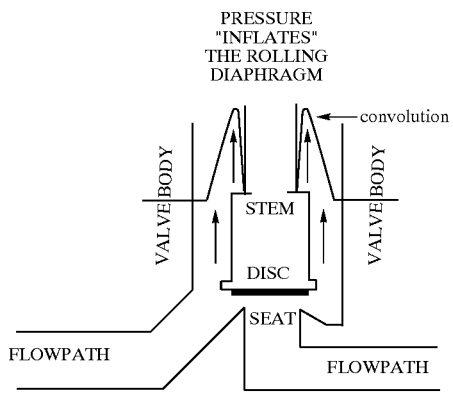

This is a diaphragm formed in a convoluted shape. It gets its name because as the stem moves, the diaphragm "rolls" at the convolution. It is frequently used in a manner similar to a u-cup, that is, to seal the gap between a linear moving shaft and the valve body. But unlike the u-cup, the rolling diaphragm is permanently affixed to both the shaft and the valve body. Because it is affixed to the shaft and also "inflates" from fluid pressure, the force of the fluid directly impacts the movement of the shaft. In some cases, such as a relief valve, this force is used to accelerate the movement of the shaft. In a pressure regulator, the force on the rolling diaphragm is what causes the shaft to move, so it is referred to as a "sensing" diaphragm.

Also shown in FIGS. 9 and 10 is a bullet rod spring 910. The bullet rod spring is disposed between the bullet port 130 and the orifice seal 150. The purpose of the optional bullet rod spring 910 is to bias the tapered periphery 152 against the tapered bore 168 to produce a better seal when there is minimal flow through the sensor 100.

Figure 13:
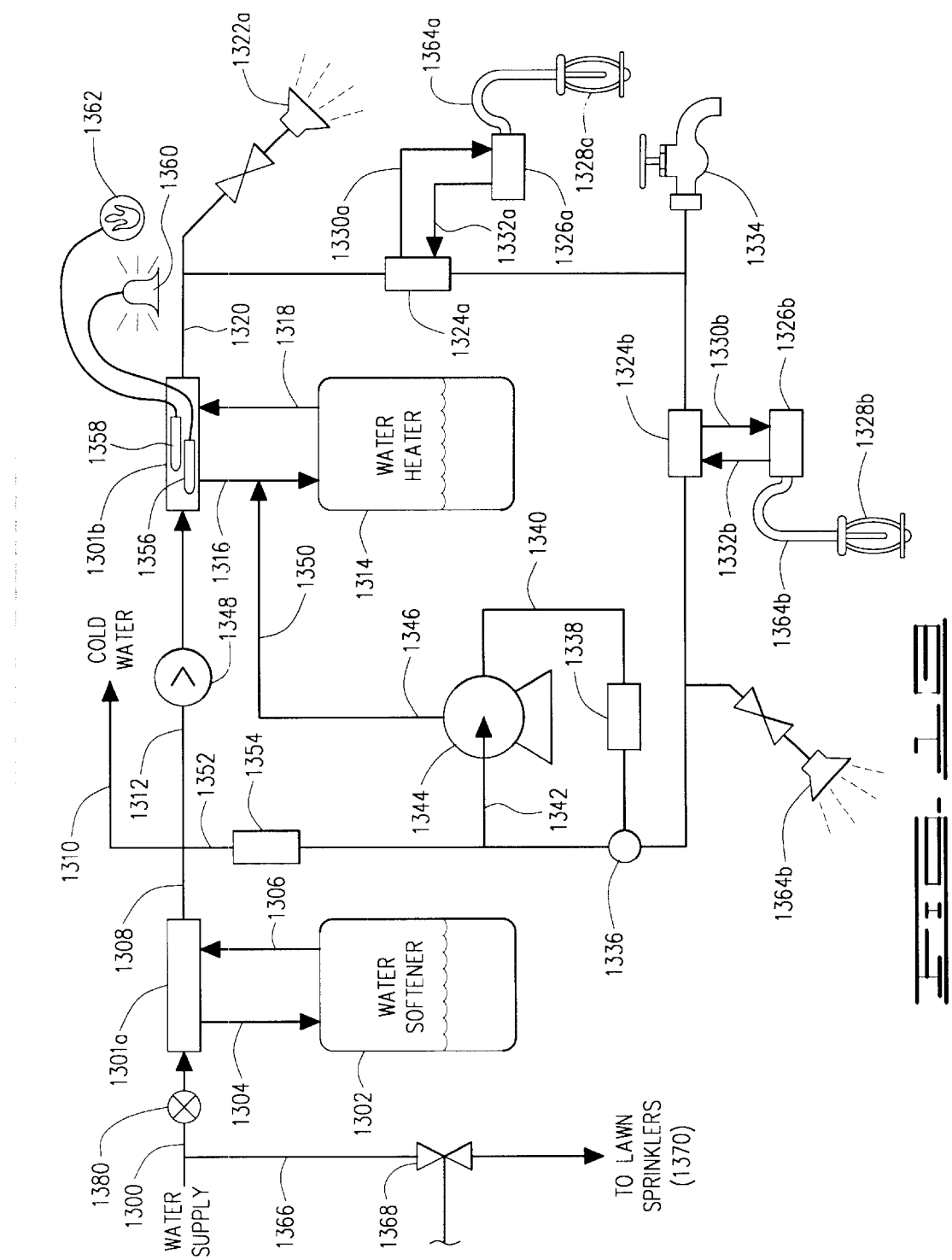
FIG. 13 is a schematic view of a fire protection system incorporating both domestic uses and the improved flow apparatus described in the present invention.

One embodiment of a fire protection system incorporating all apparatus of the present invention is illustrated in FIG. 13. The water from the water supply 1300 first flows through a flow sensor 1301a passing through an inlet softener line 1304 to a water softener 1302 or similar water treatment or processing device and thence through the outlet softener line 1306 back through the flow sensor 1301a. The flow sensor 1301a typically directs water through the inlet softener line 1304 through the water softener 1302 and then back through the sensor to a first pipe section 1308. The flow sensors 1301a and 1301b could be of the type shown in FIGS. 1 and 2 or 9 and 10 and accompanying text. Alternatively, the device could be any of the type of devices disclosed in the Parent Applications. However, whether there is an excessive water demand in the system, for example such as one caused by the operation of a fire protection sprinkler, there is a mechanism incorporated in the flow sensor 1301a which allows water to bypass the water softener 1302 increasing the flow rate through the system. Preferably, both sensors 1301a and 1301b would be of the type shown in FIGS. 9 and 10 because those devices with the convoluted diaphragm 900, minimize the amount of bypass water which does not pass through the water softener 1302 or water heater under 1314 normal operating conditions. The water, which is passed through the water softener 1302, is next split, some of it passing into the cold water piping 1310, and the rest of it passing into a second pipe section 1312.

The water from the second pipe section 1312 next passes through a second flow sensor 1301b. A check valve 1348 may also be incorporated in the second pipe section 1312. The check valve 1348 prevents back flow of water, which potentially could be stagnant from the fire protection system, to the cold water piping and/or the water softener. If a check valve is used, it could be any of the check valves shown in FIGS. 3 through 21, whether in single or double check configuration. The type of device shown in FIGS. 3, 13, and 14 could be used as both a check valve and the flow sensor, 1348, 1301a, and 1301b, respectively. This would require adding the device inlet and outlet ports as shown on the flow sensors 1301a and 1301b. The second flow sensor 1301b passes water down through a water heater 1314 via an inlet heater line 1316, and back to the sensor via an outlet heater line 1318. Again, the second flow sensor 1301b incorporates a bypass means which allows water to bypass the water heater where there is an excessive demand. After being heated, the water passes into a multi-purpose pipe section 1320. Attached to the multi-purpose pipe section 1320 are typical domestic uses such as a shower head 1322 and a faucet 1334. Other uses, such as toilets, dishwashers, washing machines, and the like may also be attached to the multi-purpose pipe section 1320. Also in communication with the multi-purpose pipe section 1320 are one or more sprinkler heads 1328. Sprinkler heads are in communication via a passive pump 1324 and a head fitting 1326 with a multi-purpose pipe section 1320. The purpose of the passive pump is to use the velocity head of water flowing through the multi-purpose pipe section 1320 to circulate water to and around the sprinkler heads 1328 to minimize stagnation.

Two flow sensors are incorporated into the multi-purpose piping system. If there is no water softener, there will not be a need for the flow sensor 1301a. The only flow sensor 1301b will be on the hot water heater. Alternatively, it may be desirable to have only one flow sensor present at the water softener. In such a case, the flow sensor at the water softener will also measure the cold water flow, potentially contributing to more false alarms in the multi-purpose alarm system. However, this may be desirable where the risk of false alarms is not substantial, and the cost savings is sufficient enough to justify a single sensor at the water softener only. It is not believed that the hot water heater will cause a significant pressure drop in the flow therethrough. Therefore, the bypass means at the hot water heater is not believed to be necessary to ensure that adequate flow is available for fire protection needs. Rather, as shown, the advantages that the flow sensor placed on the hot water heater only measures the flow through the hot water domestic uses, as well as the flow to the fire protection sprinklers. Thus, the chance of a false alarm is minimized.

From the passive pump 1324, water is passed to a head fitting 1326. The water passes to the head fitting 1326 from the multi-purpose pipe section 1320 via the head supply line 1330. It is returned to the multi-purpose pipe section 1320 via the head return line 1332. A reverse-j fitting 1364 supplies water from the head fitting 1326 to the sprinkler head 1328. The purpose of the reverse-j fitting 1364 is to cool the water supplied to the sprinkler head 1328 to insure that the sprinkler head is not activated by the temperature of the water supplied thereto. Most sprinkler heads are set to activate at a temperature of 155° Fahrenheit. While it is not anticipated that hot water flowing through the multi-purpose piping system will exceed that temperature, the reverse-j fitting 1364 helps to insure that, just in case the water does exceed that temperature, the fire sprinkler is not inadvertently activated by the temperature of water passing thereto.

As shown, a thermocouple 1336 in communication with the pump controller 1338 and control wiring 1340 operates to ensure that a minimum desired temperature is maintained in the common piping 1320. The thermocouple 1336 measures the temperature of water in the common piping 1320. The temperature of surrounding air could also be measured either in place of or in addition to measurement of the water temperature is measured it may be desirable to leave the pump running continuously, placing extra wear and tear plus electrical costs on the system. If the temperature of the water drops below a preselected level (preferably at least 40° Fahrenheit), the pump controller 1338 initiates the action of a pump 1344. The pump 1344 draws water from the common piping via a pump inlet pipe 1342. A pump outlet pipe 1346 directs water through a check valve and a return pipe 1350 so that it is recycled through the water heater 1314. The return pipe 1350 connects to the inlet heater line 1316 to complete the circuit. Thus, water moved by the pump 1344 through the water heater 1314 is reheated to maintain a minimum temperature in the multi-purpose pipe section 1320.

An alternative feature is also shown in FIG. 13. The alternative feature is a return leg supply pipe 1352 and a return leg flow sensor 1354. The return leg supply pipe 1352 may be in communication with the first pipe section 1308. The return leg flow sensor 1354 normally prevents any water from flowing directly from the first pipe section 1308 through the return leg supply pipe 1352 into the multi-purpose pipe section 1320. However, when an excessive water demand is made on the multi-purpose pipe section 1320, the pressure may drop low enough so that the return leg flow sensor 1354 allows water to pass there through directly from the first pipe section 1308, supplementing the flow sensor 1301b and the other elements of the water heater system. Alternatively, the return leg flow sensor 1354 may draw water from the multi-purpose pipe section 1320 at a point adjacent to the outlet from the flow sensor 1301b.

As used herein, the multi-purpose pipe section 1320 will often be referred to as 'common piping." The "common piping" may include the second pipe section 1312, the inlet heater line 1316, the outlet heater line 1318, the multi-purpose pipe section 1320, the pump inlet pipe 1342, the pump outlet pipe 1346, as well as the flow sensor 1301b. Further, in the embodiment shown in FIG. 13, the common piping includes all piping elements excluding the cold water system, and also excluding piping related to the water softener system. As noted above, in some circumstances it may be desirable to have the flow sensor with the fire alarm enunciation means located at the water softener. Where the flow sensor with the fire alarm enunciation means is located at the water softener, the term "common piping" will include the cold water piping, as well as the piping related to the water softener.

The flow sensor 1301b incorporates a trouble sensor 1356 and a fire sensor 1358. An alarm enunciator is in electronic communication with the trouble alarm 1360 and a fire alarm 1362. Preferably, the fire alarm 1362 will also have a remote notification feature, which could advise the fire department, for example, that a fire alarm condition exists in the structure. As shown, as a differential in the linear placement of the fire sensor 1358 compared to the trouble sensor 1356. The remote notification feature will incorporate the use of a modem or other electronic dialing means to notify the police and play, for example, a pre-recorded message notifying the police and/or fire department of the fire alarm condition in the structure.

The system shown in FIG. 13 may also incorporate a regulator 2380 disposed between the water supply 2300 and the sensor 2301a. The regulator 2380 maintains the supply water pressure to the common piping 1320 at a specified pressure. The advantage of such a setup is that the sensors 2301a and b can then be supplied in a factory-adjusted manner. No field adjustments of such sensors would be required. Factory set sensors reduces the flexibility of the system, but it also decreases the chances that an installer will improperly adjust the settings of the sensors causing it not to work properly.

Figure 14:
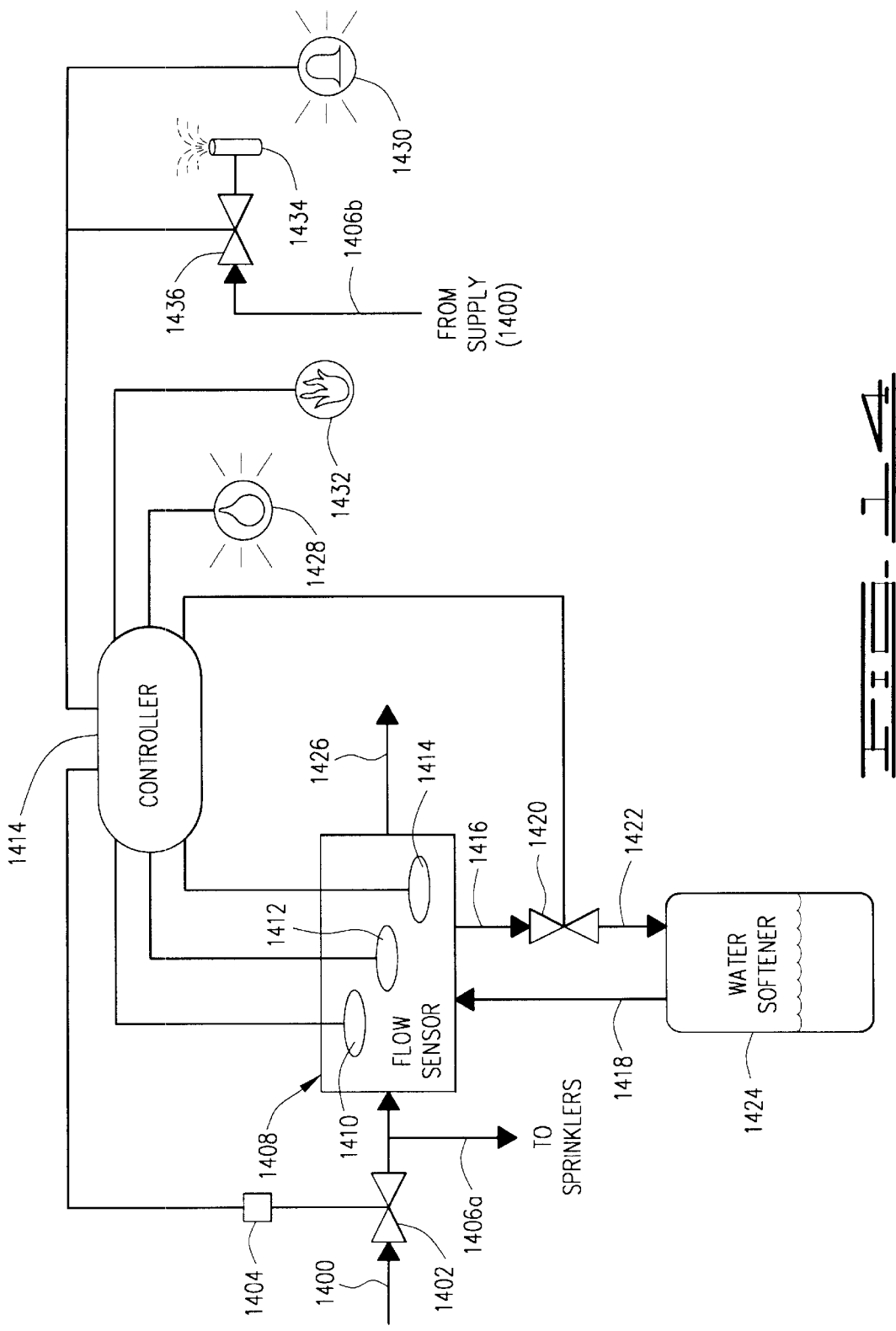
FIG. 14 is a schematic view of a water softener bypass incorporating the principles of the present invention.

A variation on the system shown in FIG. 13 is illustrated in FIG. 14. The system shown in FIG. 14 provides for integration with the controller 1414 which incorporates, what is typically referred to as a home alarm system. Home alarm systems typically have three modes: first, a disarmed mode, where the sensors are not activated; second, an away mode, where the system assumes that no one is home and all of the sensors are activated, including motion detector sensors which may be in the house and which would be alarmed by anyone moving about the house; and third, an alarm at home mode where the external sensors, for example on doors and windows, are activated, but the motion detector type sensors in the house are not activated so that the occupants can move about without activating the alarm. The controller 1414 for the system will preferably incorporate these types of features. If it does not incorporate these features, it is at least in communication with a home alarm controller which does incorporate the features. Water enters the system from a supply 1400. It first flows through a main control valve 1402, which has an electronic indicator 1404 in communication with the controller to identify whether the valve is open or closed. In general, since the system will be feeding the fire protection system, it should always be open, and an alarm condition should be created if it is closed inadvertently—that is the purpose of the sensor 1404. After flowing through the main control valve 1402, a portion of the flow will flow through a flow sensor 1408 and another portion may pass outside to yard sprinklers 1406. The flow sensor preferably incorporates three separate detectors. A first detector 1410 is used to activate the water monitoring feature and to allow flow through the system when the water monitoring feature is not activated. A second detector 1412 acts as a "trouble" detector, and activates a valve 1436 to shut off a yard sprinkler. A sprinkler shut off valve 1436 disposed between the supply and the yard sprinklers 1434 in communication with the controller 1414 facilitates the shut off upon detection of a trouble alarm. Also, a circuit may open to shut off lawn sprinklers. A third sensor 1414 activates a full-fledged fire alarm, and preferably will alert outside authorities via a dial up connection or the like. Fluid flowing into the flow sensor typically passes out therefrom through a device outlet 1416. As shown, a water softener 1424 is fed by the device outlet 1416. Disposed in the device outlet 1416 is a normally closed valve 1420 which is controlled by the controller 1414. If a demand for flow is detected by the first flow sensor 1410, and the system is not in alarm away mode, the detection of flow demand signals the controller to open the valve 1420. It then passes through a subsequent supply line 1422 through the water softener 1424 back to the flow sensor through a device return line 1418. Thence, the fluid passes out of the flow sensor through the outlet line 1426. A water monitor alarm 1428 is controlled by the controller as is a full fledged fire alarm 1432 and a trouble alarm 1430. When the alarm panel is set for "away mode," valve 1420 is not activated and water flow greater than that needed for an ice maker (hereinafter referred to as "de minimis" flow is forced through a flow sensor 1408 causing a first detector 1410 to operate a water monitor alarm 1428.

The text and illustrations of the marketing materials for various sensors designed according to the Parent Applications and the present application are attached hereto as Exhibits "A" through "C" and incorporated by reference.[1] Also attached and incorporated by reference as Exhibit "D" is an electronic control panel for use in systems of the type of system illustrated in FIGS. 13 and 14. The flow sensor used is similar to the sensors disclosed in FIGS. 1 and 2, but with a fixed bullet rod. The flow sensor is in communication with a monitor panel and/or a residential alarm system, which send a signal to a motorized valve to shut off flow when specified flow conditions are detected indicating a leak in the system. The systems can work for either multipurpose or single-purpose plumbing systems.

[1] The marketing materials prepared by Detectaflow, LLC, a company affiliated with the inventor.

Figure 15:
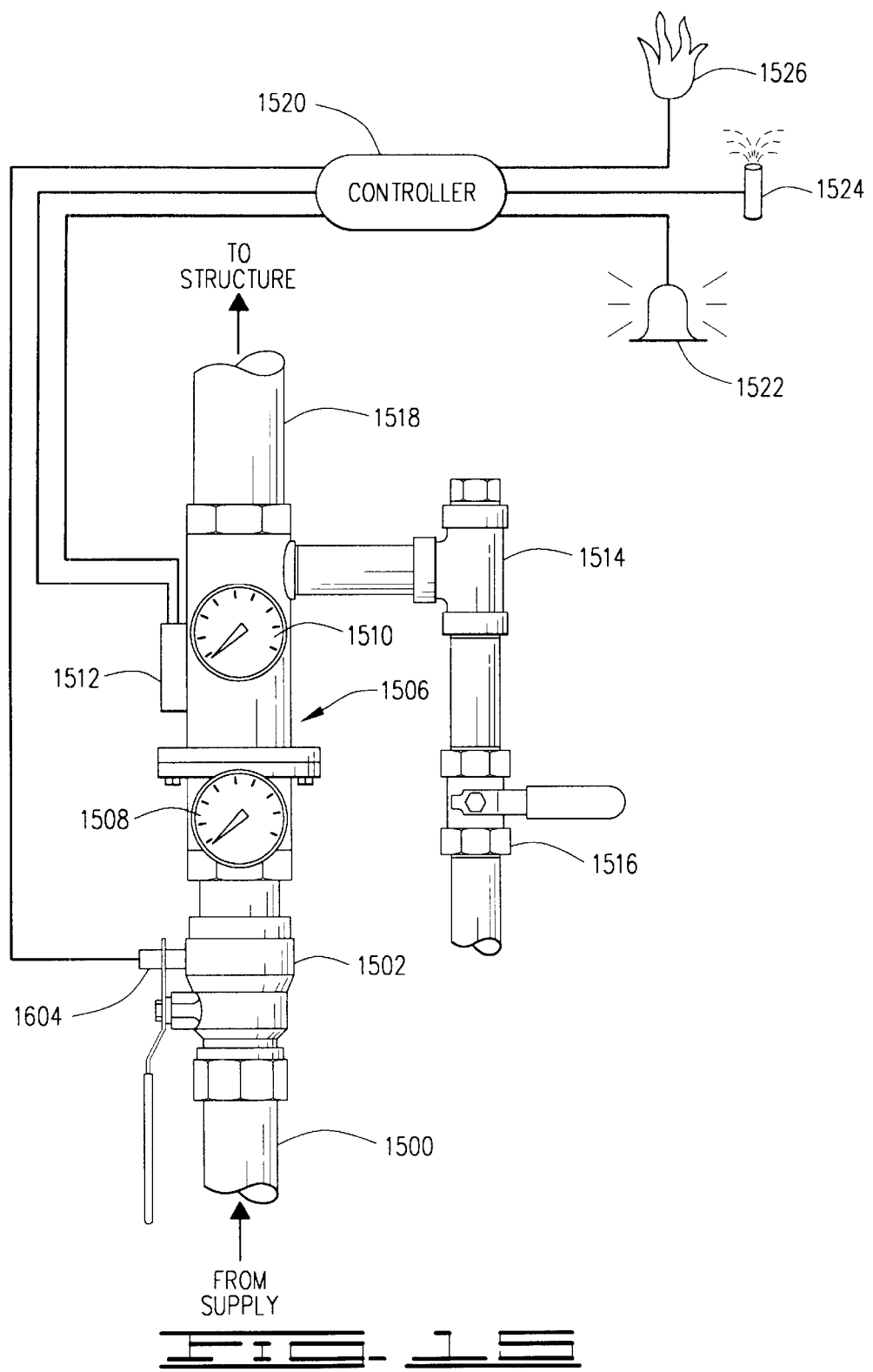
FIG. 15 shows a prior art riser assembly incorporating the principles of the present invention.

FIG. 15 shows a riser assembly incorporating the apparatus of the present invention. The riser assembly is intended for use in a multi-purpose piping system or in a stand alone fire protection system in a structure. The riser is fed by a supply 1500. The supply first passes through a supply valve 1502 incorporating a valve tamper switch 1504. The valve tamper switch 1504 is in communication with the controller 1520. The valve should normally be open, and if it is not an indicator is sent to the controller, which will sound a trouble alarm 1522 indicating the valve 1502 is closed. The flow switch 1506 of the present invention is disposed after the supply valve 1502. As shown, the flow switch 1506, has both a pressure gauge 1508 and a flow gauge 1510. The detectors for determining flow 1512 are disposed in the outer surface of the flow switch 1506, and they are preferably incorporated within a housing so that they are protected. A drain test connection 1514 is disposed near an outlet end 1518 of the flow switch 1506. The drain test connection feeds a drain test valve 1516. The controller 1520 is in communication with the trouble alarm 1522, a yard sprinkler cut off 1524, and a fire alarm 1526.

FIG. 16 shows an alternative embodiment of a combined domestic supply fire sprinkler system 1600 using a sensor to the present invention. A water supply 1602 is provided. The water first passes through a sensor constructed according to the present invention, of the type shown in FIG. 3, for example. The sensor includes a feed for a device supply line 1606, which supplies a device such as a water softener 1610. After the water passes through the device, it is returned through a device return 1608. If there is no device, such as a water softener, there may simply be a jump over line that passes directly from the supply to the return. After passing through the device, water encounters a "T" 1612, which divides it into a cold side 1614 and a hot side 1616. The hot water side passes through a check 1618, thence into a hot water inlet 1620 through the hot water tank 1624, and back out through a hot water outlet 1622. Hot water then passes through a supply line 1626, to supply at least one fire protection sprinkler 1636, and at least one domestic use via a domestic use manifold 1638. The supply line 1626 connects to a return line 1628, which returns the water to the hot water heater through a recirculation pump 1632, to maintain a minimum desired temperature in the piping. In communication with both the supply line 1626 and the return line 1628 are one or more crossover lines 1634, which are disposed therebetween. The crossover lines 1634 typically are in communication with one or more sprinklers 1636. Also in communication with the return line 1628 is a bypass 1630. The purpose of the bypass 1630 is to allow flow to shortcut some of the supply line piping should a remote point in the return line require additional water supply, for example, to supply a fire protection sprinkler 1636.

There are many other schemes and sensor types which could be used to indicate the flow through the device using either the relative position of the orifice plate or the pressure created by displacement of the spring. All these types of devices are intended to be incorporated with the spirit and scope of the invention. The examples and configurations described above are intended by way of illustration, not by way of limitation. The basic concept of the moving orifice plate can be incorporated in a myriad of configurations of flow sensors, and is useful for not only fire protection, but also many other industries as has been noted previously.

Operation

The operation of various apparatus and systems utilizing the apparatus disclosed in the present invention will now be discussed. FIGS. 1 and 2 are flow sensors incorporating the improvements of the present invention. Water enters through the inlet 104. As the flow through the sensor 100 increases, it tends to bias the moving orifice plate 160 towards the outlet 106 overcoming the resistance of the biasing means 162. Initially, all of the flow bypasses the sensor 100, passing out through the bypass outlet 108 and returning through the bypass inlet 110. As the moving orifice plate is displaced toward the outlet, the moving orifice plate 160 approaches the detector 164 more closely. At some point, the detector will create a signal indicating the proximity of the moving orifice plate 160 thereto. The moving bullet rod 140 moves in conjunction with the moving orifice plate 160, thereby maintaining a fluid seal between the sealing plate 150 and the orifice 162. When the flared end 142 reaches the bullet port 130, the motion of the bullet rod 140 is constrained—it can no longer move in tandem with the moving orifice plate 160. At that point, the seal between the tapered periphery 150 and the tapered bore 168 is broken and flow is allowed through the orifice 162.

The operation of the sensors shown in FIGS. 9 and 10 is similar. However, fluid is prevented from flowing around the orifice plate periphery 402 by a convoluted diaphragm 900, which is attached to the second body portion 102b at a first attachment point 902 and the periphery 402 at a second attachment point 904. As the orifice plate moves, the convoluted diaphragm flexibly moves with it, preventing flow around the periphery 402. Also, a bullet rod spring 910 provides minimal force needed to seal the tapered periphery 150 to the tapered bore 168 at low-flow conditions. The rod spring 910 is optional, and will not be needed for most applications.

The detector 164 senses the location of the moving orifice plate 160. In the Parent Applications, this was accomplished by making the orifice plate 160 magnetic so that one or more Reed switches on the outside of the sensor could detect its location. However, concerns about locating a magnet in a fluid flow path led to the improvement of using at least one steel sensor on the outside of the sensor to detect the location of a ferrous-based moving orifice plate 160. The magnet used in the steel sensor is very weak, and would not present the same type of problems as a relatively strong magnet directly in the flow path.

In operation the system illustrated in FIG. 13 works as follows. Water flows into the system from a water supply 1300 to a flow sensor 1301a. Typically, a flow sensor 1301a diverts water through an inlet softener line 1304 to the water softener for treatment, however, when a demand exceeds the ability of water to flow through the water softener, a bypass mechanism incorporated in the flow sensor 1301a allows water to short circuit, and not pass primarily through the water softener, but flow through to the first pipe section 1308. Similarly, the flow sensor 1301b receives water from the second pipe section 1312. Typically, water is diverted downward through the inlet heater line 1316 through a water heater for heating, back up through the outlet heater line 1318, and then on to the multi-purpose pipe section 1320. However, when the demand for water exceeds the ability of water to flow through the water heater, a bypass mechanism allows water to flow from a second pipe section 1312 through the flow sensor 1301 to the multi-purpose pipe section 1320.

The bypass mechanism of the flow sensor 1301 operates without the need for any electronics or any external sensors. Rather, an orifice plate has an orifice, which is adapted to closely receive a bullet rod. Once the orifice has received the bullet rod, water cannot pass there through. A spring is adapted to bias the orifice plate towards a bullet port. Therefore, in a no-flow condition, the orifice plate is held against the bullet port by the spring. However, as water begins to flow around the bypass mechanism through a device, a pressure drop caused by a restriction is developed between the main inlet and the main outlet, which forces the orifice plate to compress the spring backwardly towards the main outlet. If the pressure difference becomes large enough, the orifice plate is displaced backwardly far enough so that the orifice plate clears the bullet rod and water can flow through the orifice.

The trouble detector 1356 preferably activates an alarm, which only sounds in the structure where the system is located; this alerts the residents that the water usage is approaching the fire protection level, and that if they want to avoid a fire alarm they need to reduce their water usage. The fire detector 1358 preferably activates a system with remote notification. That is, when the fire detector 1358 is activated, a call is made to a fire department or other monitoring authority, so that they can respond to the fire condition which has apparently been created in the structure. The flow required to activate the fire detector 1358 should not occur except in circumstances where a fire sprinkler has activated in response to a fire. The Parent Applications discuss the different flow regimes between typical domestic uses and flow regimes required for fire protection. It is important to calibrate the location of the detectors, which can slide either toward the outlet or away from the outlet by loosening the clips. The calibration of this system is described in the Parent Applications.

A passive pump 1324 only operates when water flows to the multi-purpose pipe section 1320. Since this is a multi-purpose pipe section, water will flow through the multi-purpose pipe section 1320 on a regular basis to supply, for example, shower heads 1322 or faucets 1334. In addition, where a pump 1344 is provided to maintain re-circulation to maintain a minimum temperature, the pump 1344 will also provide flow through the multi-purpose pipe section 1320. When there is flow through the multi-purpose pipe section 1320 there will be velocity head associated therewith. The passive pump 1324 takes advantage of this velocity head. As water passes into the chamber, a differential pressure is created by the configuration of the inlet and the outlet such that water is drawn into the inlet and pulled out of the outlet opening. A vacuum of sort is created by facing the outlet opening away from the inlet. Thus, the velocity head is used to create a flow through the supply and return lines, 1330 and 1332, respectively.

However, when a fire sprinkler head 1328 activates, the water demand will be so great that water will be supplied to the head fitting through both the head supply and head return lines 1330 and 1332, respectively. That is, both lines operate as supply lines when a fire sprinkler operates. It has the advantage of allowing small supply lines to be used than would be required if only one line were in place. In addition, there is a redundancy because even if a plug were to develop in one of the lines, the other line would probably not be plugged and would still provide water to the sprinkler head.

The operation of the return leg flow sensor 1354, in many respects, is like the flow sensor 1301. However, it does not have the inlet or outlet ports for devices such as water softeners nor need to have an alarm output. The only purpose of the return leg flow sensor 1354 is to allow flow there through when the differential pressure from the inlet to the outlet increases to an extent indicating that additional water flow needs to be allowed. Again, when the differential pressure rises to that level, the orifice plate is displaced to pass the end of the bullet rod allowing flow through the orifice. Internally, the flow sensor 1301 is attached both to the first pipe section 1308 and to the tail end of the multi-purpose pipe section 1320. It is conceivable that where there are multiple sprinkler heads attached to the multi-purpose pipe section 1320, during a fire, there may less than sufficient water to feed the sprinkler heads toward the end of the multi-purpose pipe section 1320. Therefore, additional water would be allowed to pass through the return leg flow sensor 1354 feeding these sprinklers at or near the end of the multi-purpose pipe section 1320. This additional water supply would assist these sprinklers in doing their job of suppressing a fire.

The addition of the convoluted diaphragm to the sensors 1301*a* and b used in the system shown in FIG. 13 helps to ensure that, under normal flow conditions, substantially all of the water entering the structure has passed through the external device (e.g., water softener). Similarly, the use of the moving bullet rod 140 with sealing plate 150 attached minimizes leakage through the orifice 166 under normal operating conditions. Thus, the improved sensor disclosed herein will improve the efficiency of operation of the types of systems shown in FIGS. 13, 16 and 17.

The operation of the system illustrated in FIG. 14 illustrates the use of an electronic controller in cooperation with the flow sensor having three stages of detection. As fluid flows through the flow sensor, at some point it reaches a flow great enough to activate a first detector 1410. This first detector sends a signal to the controller, which activates the normally closed valve 1420 to open. This allows flow through the water softener into the system. An increased flow will activate the second detector 1412, which communicates this situation to the controller 1414 and activates a trouble alarm 1430. At this point, in a mode where the controller and/or the home security system are in the alarm away mode, a demand for water will, instead of activating the valve 1420 to open, send an water alarm 1428 indicating that there is either a leak or an unauthorized demand for water. This may first activate a trouble-type alarm, and subsequently may notify outside officials, such as a fire department or a monitoring agency, should the water monitor remain in place for a sufficient length of time.

The operation of the riser assembly incorporating the flow sensor of the present invention is relatively straight forward. The operation of the flow sensor 1506 is the same as previously described above. However, the riser assembly is provided either pre-assembled or in a package with simple assembly instructions. It preferably includes substantially all of the piping and sensor components shown in FIG. 15 (excluding the controller). A tamper switch 1504 on a valve 1502 sends an alarm signal to the controller if the valve 1502, which should normally be open, is inadvertently closed. The flow sensors 1506 includes an outlet port or attachment of the drain test connection 1514 and test valve 1516 incorporated thereon. Once connected, the test valve 1516 is normally closed and the valve 1502 is normally open to allow flow therethrough, which it is being measured in the flow sensor 1506.

The operation of the device shown in FIG. 16 is very much like the operation of the device shown in FIG. 13. In practice, it is much simpler to install because the use of manifolds 1638 minimize the amount of piping that has to be run to specifically supply all the domestic uses, such as a shower head 1322 and faucets 1334, and the like.

While the invention has been shown, illustrated, described and disclosed in terms of specific embodiments or modifications, the scope of the invention should not be deemed to be limited by the precise embodiment or modification therein shown, illustrated, described or disclosed. Such other embodiments or modifications are intended to be reserved especially as they fall within the scope of the claims herein appended.

EXHIBIT "A"
Multipurpose Fluid Flow Monitor Marketing Materials

"Standard" Fluid Flow Monitor:

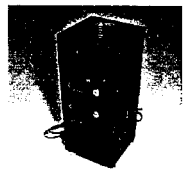

The *DetecaFlow, Standard Fluid Flow Monitor* is designed to detect as little as 8 ounces of flow per minute. The slightest drop in the outlet side pressure moves the orifice piston against the spring bias resulting in activation of the flow sensor.

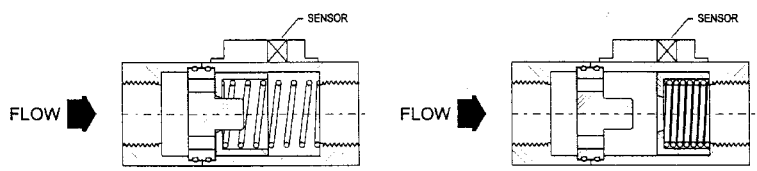

Typical Water Flow Detection Arrangement:

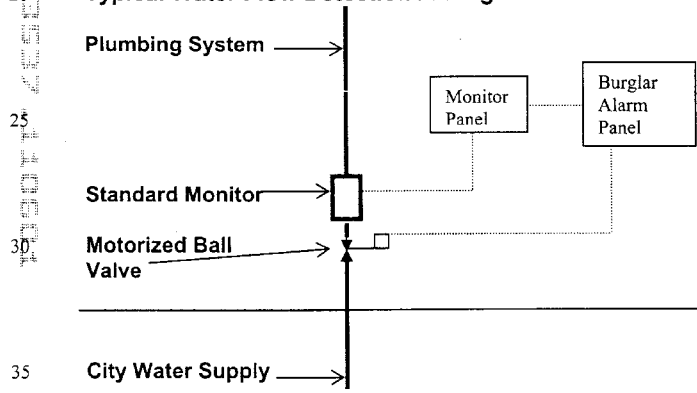

The Standard Monitor is installed on the plumbing water supply to the house. The monitor may be installed in combination with a motorized ball valve. The ball valve is normally in the open position and will control the supply of water to the house. The Monitor Panel communicates with the burglar alarm panel to signal if the owner is home or away and the logic to be used. When the owner "arms" the burglar alarm system in the away mode, the monitor senses slight water flows over time. When a leak is detected in the plumbing system, a signal is sent to the Central Station via the burglar alarm panel. With owner authorization, the Central Station can turn the motorized valve off with contacts that are provided within the burglar alarm panel. The control panel will also function as a keypad, independent of the burglar alarm system, with the addition of a transformer and local alarm bell.

62

EXHIBIT "B"
Mini Riser Marketing Materials

"Mini-Riser":

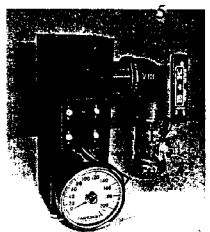

The *DetectaFlow, Mini-Riser* is intended for use on standard, wet pipe, fire sprinkler systems, to detect water flow created by the operation of a fire sprinkler. The device is equipped with a single water flow fire alarm switch. The Mini-Riser is a single in-line fitting that performs the functions of a check valve; water flow switch; drain test connection and is tapped for a water pressure gauge.

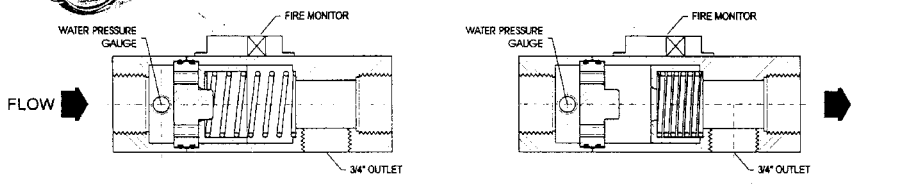

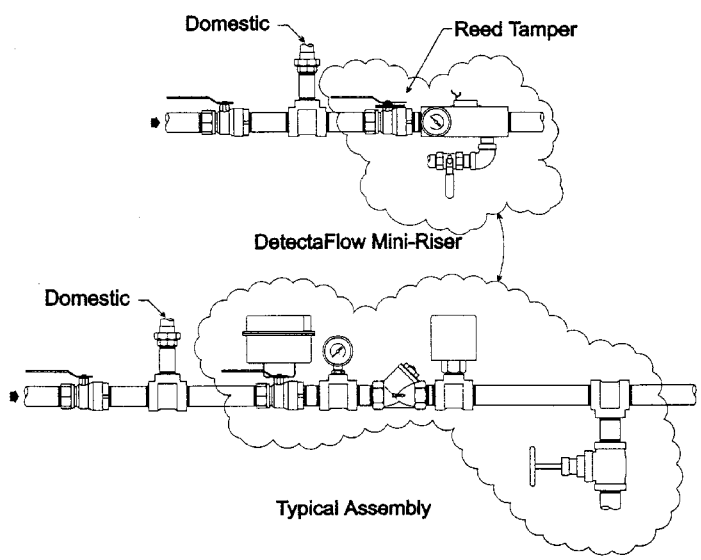

Typical Assembly

A low flow sensor may be installed on the Mini-Riser when it is installed on the water line that supplies water for both domestic and the fire sprinkler systems. A motorized control valve (installed on the domestic supply) and monitor panel may be installed to detect both low flow leaks and fire flow emergencies. Note: Local plumbing codes may require a back flow prevention device be installed between the fire sprinkler system and the domestic water connection.

EXHIBIT "C"
Standard Fluid Flow Monitor Marketing Materials

"Multipurpose" Fluid Flow Monitor:

The *DetectaFlow, Multipurpose Water Flow Monitor* is designed for multipurpose plumbing systems to perform three basic functions: 1) Operates as a fire sprinkler system water flow alarm; 2) functions as a low water flow monitor to detect plumbing system leaks and 3) is designed to allow for the installation of water softeners or filters without adversely affecting the operation of the fire sprinkler system.

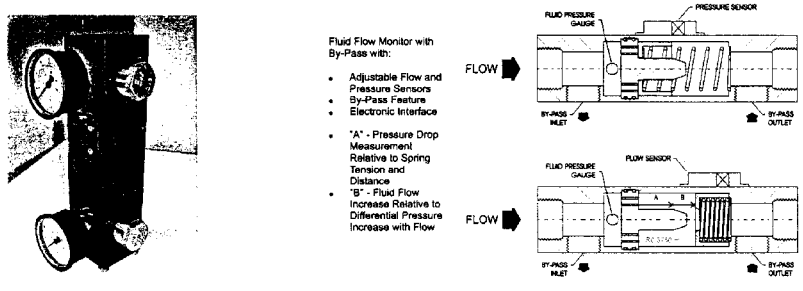

*FLUID FLOW MONITOR with BY-PASS*

Typical Application:

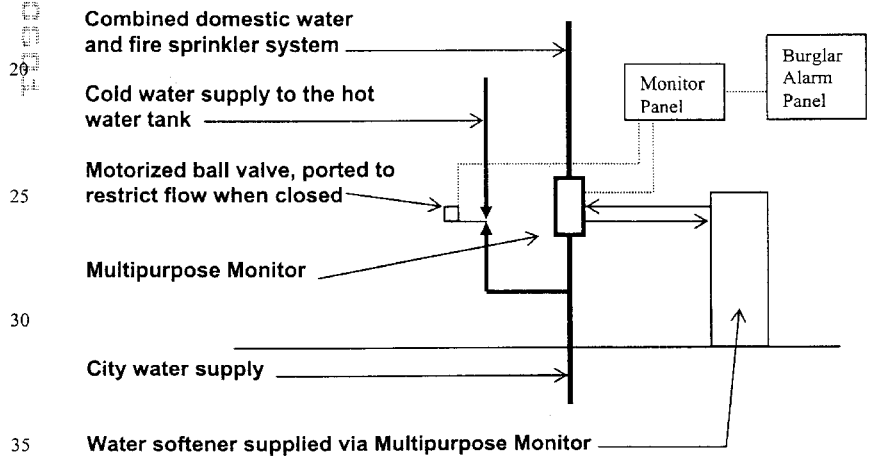

- Combined domestic water and fire sprinkler system
- Cold water supply to the hot water tank
- Motorized ball valve, ported to restrict flow when closed
- Multipurpose Monitor
- City water supply
- Water softener supplied via Multipurpose Monitor
- Monitor Panel
- Burglar Alarm Panel In addition to enunciating a water flow fire alarm, the Monitor Panel uses logic to shut off lawn sprinklers and restricts domestic (hot water) flow when a fire flow condition is detected.

EXHIBIT "D"
Electronic Control Panel Marketing Materials

Electronic Control Panel

The *DetectaFlow Control Panel* provides the intelligence needed to truly enhance the operation of *DetectaFlow* series of water flow monitors.

The *Control Panel* incorporates multifunctional logic to:

- Detect and react to incipient plumbing system failures and

- Enunciate alarms and communications while controlling other water outflows during fire sprinkler activation in stand alone or combined plumbing/fire sprinkler systems.

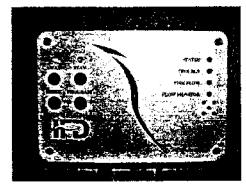

Keypad buttons intergraded into the *DetectaFlow Control Panel* combined with visual and audible displays offers independent keypad operation for basic functions.

The *DetectaFlow Control Panel* may also be connected to your security alarm panel to accept commands from the security system keypad. Integration with the security system enhances overall system operation, shares battery power backup capabilities and enables central station communication and response.

Independent Method of Operation

A simple plug in type transformer may be used to power the *Control Panel* and basic system functions. Following are the primary operations performed by the *Control Panel*:

Away Mode: In the Away Mode the *Control Panel* initiates water flow alarm contacts when slight, continuous water flow within the plumbing system exceeds programmed time periods of 1, 5 or 10 minutes. This feature applies to *DetectaFlow Monitors* equipped with a low flow sensor.

Stay Mode: In the Stay Mode the *Control Panel* initiates a keypad sound and blinking light when continuous water flow within the plumbing system exceeds programmed time periods of 30, 45, 60 or indefinite minutes. This feature applies to *DetectaFlow Monitors* equipped with a low flow sensor.

Fire Flow Alarm: When the monitor senses a fire sprinkler water flow, a 15 second delay is initiated. If the fire flow continues after the delay period, fire alarm contacts operate. The Fire Flow Alarm feature operates in both Away and Stay modes. This feature applies to *DetectaFlow Monitors* equipped with a fire flow sensor.

Lawn Sprinkler Shunt: The automatic operation of a lawn sprinkler system during emergency fire sprinkler activation may cause the fire sprinkler system to fail or to transmit an alarm. *DetectaFlow Monitors* equipped with a low flow sensor automatically ceases lawn sprinkler flow upon detection of water flow in the plumbing/fire sprinkler system. The lawn sprinkler shunt feature remains in operation if the monitor flow increases into the fire flow range. Lawn sprinkler operation resumes when plumbing/fire sprinkler flow ceases.

Method of Operation – Connection to Security System

The *DetectaFlow Control Panel* may be wired to the security system panel hidden from sight. In this configuration, commands are instigated by the security system keypad. As an example, the Away and Stay (or Disarmed) Modes are initiated by the operation of the security system keypad. Following are the basic operations performed by the *Control Panel*, in addition to the previously defined features:

Central Station Remote Control of Plumbing System Failures: A *DetectaFlow Monitor* and a normally open motorized ball valve are installed on the water supply line where it enters into the house. When the low flow sensor initiates a low water flow alarm in the Away mode, a notification is sent to the Central Station. A set of contacts within the security alarm panel may be operated upon command from the Central Station to close the motorized ball valve and the water supply to the house. This feature applies to *DetectaFlow Monitors* not used for fire protection, equipped with a low flow sensor.

Combined Plumbing/Fire Sprinkler Systems: *DetectaFlow, Multipurpose Monitors,* measure water flow to differentiate between domestic use and fire flow. *Control Panel* logic prevents false alarms where high domestic flows are anticipated.

When the monitor senses a fire flow a 15 second alarm delay is initiated. At the beginning of the delay, a bypass contact in the *Control Panel* closes a normally open motorized ball valve located on the cold water supply to the hot water tank. The ball valve is ported to reduce, not eliminate the flow to the hot water tank. In a simulated fire flow condition caused by excessive domestic use, much of the flow will be tempered water. When the ported valve closes to restrict excessive domestic use, the flow level drops below the fire flow criteria where the fire alarm will not enunciate. If however, a fire sprinkler has activated and the fire flow rate continues after the motorized valve closes a fire alarm will be initiated.

Water Softener Regeneration, Disable Low Flow Alarm: The *DetectaFlow, Multipurpose Monitor* may be equipped with a low flow sensor to detect plumbing/sprinkler system failures. The *Multipurpose Monitor* should be installed to sense the water flow to all plumbing fixtures including water softeners. The regeneration process of water softeners discharges water that could be mistaken as a plumbing system failure. Water softener heads may be equipped with electrical contact kits that operate when the water softener goes into regeneration. The *DetectaFlow Control Panel* has a set of input connectors that will disable the system low flow alarm features while the water softener is in the regeneration cycle.

TECHNOLOGIES

IFD TECHNOLOGIES 1640 SE 37th Street, Oklahoma City, OK 73129 405.670.8207

I claim:

1. A flow sensor of the type having inlet and outlet ports, a moving plate means for moving in response to fluid flow through the sensor, a sensor means for sensing the movement of the moving plate and creating a signal related to its location, and a biasing means for biasing the plate towards the inlet, the improvement comprising:
   a. the moving plate composed of a magnetizable material;
   b. the sensor means comprised of a steel sensor disposed adjacent to a path traveled by the moving plate for sensing the location of the moving plate.

2. The sensor of claim 1, further including a sealing means for preventing flow through the sensor until a specified differential pressure across the sensor is reached.

3. The sensor of claim 2, where the sealing means is a bullet rod adapted to be received within an orifice defined in the moving plate, such that the bullet rod prevents flow through the orifice until the moving plate is displaced past a terminal end of the bullet rod.

4. The sensor of claim 3 where the a bullet rod is slidingly received in a bullet port mounted within the sensor and includes at a terminal end a sealing plate adapted to sealingly engage the moving orifice plate, the bullet rod moving in relation to the moving plate until a flared end of the bullet rod engages a bullet port, causing the sealing plate to disengage from the moving plate allowing fluid to pass through the orifice plate.

5. A plumbing system for a structure of the type having a water supply feeding a piping system with at least one demand supplied thereby, an alarm system having an armed away mode, and the sensor of claim 1 for detecting flow through the piping system, the improvement comprising:
   a. a signal means for communicating with the alarm system and sending a signal indicating when the alarm system is in the armed away mode; and
   b. a valve means controlled by the signal means for preventing more than de minimis flow through the piping system when the alarm system is in the armed away mode and for allowing flow when the alarm is not is said mode.

6. A flow sensor of the type having inlet and outlet ports, a moving plate means for moving in response to fluid flow through the sensor, a sensor means for sensing the movement of the moving plate and creating a signal related to its location, a biasing means for biasing the plate towards the inlet, and a sealing means, the improved sealing means comprising: a bullet rod slidingly received in a bullet port mounted within the sensor and including at a terminal end of the bullet rod a sealing plate adapted to sealingly engage the moving orifice plate, the bullet rod moving in relation to the moving plate until a flared end of the bullet rod engages a bullet port, causing the sealing plate to disengage from the moving plate allowing fluid to pass through the orifice plate.

7. The sensor of claim 6 where a seal biasing means for urging the sealing plate against the moving plate is provided.

8. The sensor of claims 7 where the seal biasing means it a spring disposed between the bullet port and the sealing plate.

9. A plumbing system for a structure of the type having a water supply feeding a piping system with at least one demand supplied thereby, an alarm system having an armed away mode, and the sensor of claim 6 for detecting flow through the piping system, the improvement comprising:
   a. a signal means for communicating with the alarm system and sending a signal indicating when the alarm system is in the armed away mode; and
   b. a valve means controlled by the signal means for preventing more than de minimis flow through the piping system when the alarm system is in the armed away mode and for allowing flow when the alarm is not is said mode.

10. A flow sensor of the type having inlet and outlet ports, a moving plate means for moving in response to fluid flow through the sensor, a sensor means for sensing the movement of the moving plate and creating a signal related to its location, a biasing means for biasing the plate towards the inlet, and a sealing means, the improvement comprising a second sealing means for preventing flow between an outer periphery of the moving plate and an inner surface of the sensor.

11. The sensor of claim 10 where the second sealing means is a convoluted diaphragm sealingly attached at a first point to the periphery of the moving plate and at a second point to the inner surface.

12. The sensor of claim 10 where the sealing means is a bullet rod slidingly received in a bullet port mounted within the sensor and including at a terminal end a sealing plate adapted to sealingly engage the moving orifice plate, the bullet rod moving in relation to the moving plate until a flared end of the bullet rod engages a bullet port, causing the sealing plate to disengage from the moving plate allowing fluid to pass therethrough.

13. The sensor of claim 10 where the moving plate is composed of a magnetizable material and the sensor means is comprised of a steel sensor disposed adjacent to a path traveled by the moving plate for sensing the location of the moving plate.

14. A plumbing system for a structure of the type having a water supply feeding a piping system with at least one demand supplied thereby, an alarm system having an armed away mode, and the sensor of claim 10 for detecting flow through the piping system, the improvement comprising:
   a. a signal means for communicating with the alarm system and sending a signal indicating when the alarm system is in the armed away mode; and
   b. a valve means controlled by the signal means for preventing more than de minimis flow through the piping system when the alarm system is in the armed away mode and for allowing flow when the alarm is not is said mode.

* * * * *

UNITED STATES PATENT AND TRADEMARK OFFICE
CERTIFICATE OF CORRECTION

| | |
|---|---|
| PATENT NO. | : 6,741,179 B2 |
| APPLICATION NO. | : 09/993537 |
| DATED | : May 25, 2004 |
| INVENTOR(S) | : Richard J. Young |

Page 1 of 1

It is certified that error appears in the above-identified patent and that said Letters Patent is hereby corrected as shown below:

On the title page: Item [63] insert

Column 1, line 9, --09/648,444 filed on Aug. 25, 2000 (abandoned, now application Ser. No. 10/118,207 filed Apr. 9, 2002), which was a continuation-in-part of application Ser. No.--

Signed and Sealed this

Sixteenth Day of September, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,741,179 B2 | Page 1 of 1 |
| APPLICATION NO. | : 09/993537 | |
| DATED | : May 25, 2004 | |
| INVENTOR(S) | : Richard J. Young | |

It is certified that error appears in the above-identified patent and that said Letters Patent is hereby corrected as shown below:

On the title page: Item [63] should read

--Continuation-in-part of application Ser. No. 09/567,510, filed on May 8, 2000, now Patent No. 6,333,695, which is a continuation-in-part of application Ser. No. 09/483,999, filed on Jan. 18, 2000, now Patent No. 6,239,708, which is a continuation-in-part of application Ser. No. 09/098,976, filed on June 17, 1998, now Patent No. 6,081,196.--

Replace the text starting at Col. 1, line 5 and continuing to line 19 with the following text:

--This application is a continuation-in-part of application Ser. No. 09/567,510, filed on May 8, 2000, now Patent No. 6,333,695, which is a continuation-in-part of application Ser. No. 09/483,999, filed on Jan. 18, 2000, now Patent No. 6,239,708, which is a continuation-in-part of application Ser. No. 09/098,976, filed on June 17, 1998, now Patent No. 6,081,196 (hereinafter collectively referred to as the "Parent Application").--

This certificate supersedes the Certificate of Correction issued September 16, 2008.

Signed and Sealed this

Sixteenth Day of December, 2008

JON W. DUDAS
*Director of the United States Patent and Trademark Office*